US012120049B2

(12) United States Patent
Ly et al.

(10) Patent No.: US 12,120,049 B2
(45) Date of Patent: Oct. 15, 2024

(54) TIME-DOMAIN BUNDLING OF SOUNDING REFERENCE SIGNALS

(71) Applicant: QUALCOMM Incorporated, San Diego, CA (US)

(72) Inventors: Hung Dinh Ly, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 17/481,992

(22) Filed: Sep. 22, 2021

(65) Prior Publication Data

US 2022/0103324 A1 Mar. 31, 2022

Related U.S. Application Data

(60) Provisional application No. 63/085,074, filed on Sep. 29, 2020.

(51) Int. Cl.
*H04L 5/00* (2006.01)
*H04W 72/12* (2023.01)
*H04W 72/1268* (2023.01)

(52) U.S. Cl.
CPC ....... *H04L 5/0048* (2013.01); *H04W 72/1268* (2013.01)

(58) Field of Classification Search
CPC ............... H04L 5/0048; H04L 5/0094; H04W 72/1268; H04W 72/04; H04W 72/042
(Continued)

(56) References Cited

U.S. PATENT DOCUMENTS

2020/0099434 A1* 3/2020 Wang .................... H04B 7/0452
2020/0162133 A1* 5/2020 Harrison ............. H04W 52/248
2022/0069959 A1* 3/2022 Zarifi .................... H04W 72/51

OTHER PUBLICATIONS

CATT: "Remaining Issues on UL SRS for NR Positioning", 3GPP Draft, R1-2002096, 3GPP TSG RAN WG1 Meeting #100bis, 3rd Generation Partnership Project (3GPP), Mobile Competence Centre, 650, Route Des Lucioles, F-06921 Sophia-Antipolis Cedex, France, vol. RAN WG1, No. Online Meeting, Apr. 20, 2020-Apr. 30, 2020, Apr. 11, 2020 (Apr. 11, 2020), XP051875453, 11 Pages, Retrieved from the Internet: URL:https://ftp.3gpp.org/tsg_ran/WG1_RL1/TSGR1_100b_e/Docs/R1-2002096.zip R1-2002096, CATT Remaining issues on UL SRS for NRPositioning-final.docx [retrieved on Apr. 11, 2020] p. 8.

(Continued)

*Primary Examiner* — Candal Elpenord
(74) *Attorney, Agent, or Firm* — Guang Yu Zhang; Loza & Loza LLP

(57) ABSTRACT

Aspects relate to sounding reference signal (SRS) time-domain bundling. Phase continuity may be maintained across SRS transmissions over multiple SRS occasions to enable a receiver to jointly process these SRS transmissions. In some examples, a user equipment may expect to be configured with SRS transmissions over multiple SRS occasions where SRS configurations for different SRS transmissions over different SRS occasions specify the same parameters. For example, a first SRS configuration for a first SRS transmission over a first SRS occasion may specify a first set of spatial relation information. In addition, a second SRS configuration for a second SRS transmission over a second SRS occasion may specify that same first set of spatial relation information. In this way, phase continuity may be maintained between the first SRS transmission over the first SRS occasion and the second SRS transmission over the second SRS occasion.

30 Claims, 15 Drawing Sheets

(58) Field of Classification Search
USPC .................................................. 370/329–330
See application file for complete search history.

(56) References Cited

OTHER PUBLICATIONS

Intel: "WF on Phase Discontinuity Issue for Performance Requirement", 3GPP Draft, Draft R4-1816612, 3GPP TSG-RAN WG4#89 Meeting, WF on Phase Discontinuity Issue, 3rd Generation Partnership Project (3GPP), Mobile Competence Centre, 650, Route Des Lucioles, F-06921 Sophia-Antipolis Cedex, France, vol. RAN WG4, No. Spokane, USA, Nov. 12, 2018-Nov. 16, 2018, Nov. 21, 2018 (Nov. 21, 2018), XP051496228, 5 Pages, Retrieved from the Internet: URL:http://www.3gpp.org/ftp/tsg%5Fran/WG4%5FRadio/TSGR4%5F89/Docs/R4%2D1816612%2Ezip [retrieved on Nov. 21, 2018] p. 4.
International Search Report and Written Opinion—PCT/US2021/051723—ISA/EPO—Jan. 19, 2022.

Moderator (ZTE): "FL Summary #3 on SRS Enhancements", 3GPP Draft, R1-2007234, 3GPP TSG RAN WG1 Meeting #102-e, 3rd Generation Partnership Project (3GPP), Mobile Competence Centre, 650, Route Des Lucioles, F-06921 Sophia-Antipolis Cedex, France, vol. RAN WG1, No. eMeeting, Aug. 17, 2020-Aug. 28, 2020, Aug. 28, 2020 (Aug. 28, 2020), XP051922820, 26 Pages, Retrieved from the Internet: URL:https://ftp.3gpp.org/tsg_ran/WG1_RL1/TSGR1_102-e/Docs/R1-2007234.zip R1-2007234 FL summary #3 on SRS enhancements.docx [retrieved on Aug. 28, 2020] Section 5.1.
QUALCOMM Incorporated: "UL Reference Signals for NR Positioning", 3GPP Draft, R1-1907297, 3GPP TSG RAN WG1 #97, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 4, 2019 (May 4, 2019), XP051709320, pp. 1-4, Retrieved from the Internet: URL: http://www.3gpp.org/ftp/tsg%5Fran/WG1%5FRL1/TSGR1%5F97/Docs/R1%2D1907297%2Ezip, [retrieved on May 4, 2019] the whole document, Sections 3, 4.

* cited by examiner

TIME-DOMAIN BUNDLING OF SOUNDING REFERENCE SIGNALS

CROSS-REFERENCE TO RELATED APPLICATIONS

The present application for patent claims priority to and the benefit of pending U.S. Provisional Application No. 63/085,074, titled "TIME-DOMAIN BUNDLING OF SOUNDING REFERENCE SIGNALS" filed Sep. 29, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to bundling techniques for sounding reference signal occasions.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS.

A BS may schedule access to a cell to support access by multiple UEs. For example, a BS may allocate different resources (e.g., time domain and frequency domain resources) for different UEs operating within a cell of the BS.

A UE may transmit reference signals to enable a base station to estimate the channel between the UE and the BS. For example, a UE may generate a sounding reference signal (SRS) based on a known sequence and transmit the SRS on resources allocated by the BS. The BS may then estimate the quality of an uplink channel from the UE based on the SRS and/or determine other information based on the SRS. The BS may use this channel estimate or other information to, for example, more efficiently allocate resources and/or specify transmission parameters for communication over the channel.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment is disclosed. The method may include receiving a first resource allocation for a first sounding reference signal (SRS) transmission scheduled for a first SRS occasion and a first SRS configuration for the first SRS transmission, receiving a second resource allocation for a second SRS transmission scheduled for a second SRS occasion and a second SRS configuration for the second SRS transmission, receiving an indication to maintain phase continuity across the first SRS transmission and the second SRS transmission, and transmitting the first SRS transmission during the first SRS occasion and the second SRS transmission during the second SRS occasion after verifying whether use of the first SRS configuration and the second SRS configuration will maintain the phase continuity across the first SRS transmission and the second SRS transmission.

In some examples, a user equipment may include a transceiver, a memory, and a processor coupled to the transceiver and the memory. The processor may be configured to receive via the transceiver a first resource allocation for a first sounding reference signal (SRS) transmission scheduled for a first SRS occasion and a first SRS configuration for the first SRS transmission, receive via the transceiver a second resource allocation for a second SRS transmission scheduled for a second SRS occasion and a second SRS configuration for the second SRS transmission, receive via the transceiver an indication to maintain phase continuity across the first SRS transmission and the second SRS transmission, and transmit via the transceiver the first SRS transmission during the first SRS occasion and the second SRS transmission during the second SRS occasion after verifying whether use of the first SRS configuration and the second SRS configuration will maintain the phase continuity across the first SRS transmission and the second SRS transmission.

In some examples, a user equipment may include means for receiving a first resource allocation for a first sounding reference signal (SRS) transmission scheduled for a first SRS occasion and a first SRS configuration for the first SRS transmission, means for receiving a second resource allocation for a second SRS transmission scheduled for a second SRS occasion and a second SRS configuration for the second SRS transmission, means for receiving an indication to maintain phase continuity across the first SRS transmission and the second SRS transmission, and means for transmitting the first SRS transmission during the first SRS occasion and the second SRS transmission during the second SRS occasion after verifying whether use of the first SRS configuration and the second SRS configuration will maintain the phase continuity across the first SRS transmission and the second SRS transmission.

In some examples, an article of manufacture for use by a user equipment includes a non-transitory computer-readable medium having stored therein instructions executable by one or more processors of the user equipment to receive a first resource allocation for a first sounding reference signal (SRS) transmission scheduled for a first SRS occasion and a first SRS configuration for the first SRS transmission, receive a second resource allocation for a second SRS transmission scheduled for a second SRS occasion and a second SRS configuration for the second SRS transmission, receive an indication to maintain phase continuity across the first SRS transmission and the second SRS transmission, and transmit the first SRS transmission during the first SRS occasion and the second SRS transmission during the second SRS occasion after verifying whether use of the first SRS configuration and the second SRS configuration will maintain the phase continuity across the first SRS transmission and the second SRS transmission.

In some examples, a method for wireless communication at a base station is disclosed. The method may include transmitting to a user equipment a plurality of SRS configurations that are defined to maintain phase continuity across a plurality of sounding reference signal (SRS) transmissions associated with a plurality of SRS occasions, receiving from the user equipment a first SRS transmission of the plurality of SRS transmissions during a first SRS occasion of the plurality of SRS occasions, receiving from the user equipment a second SRS transmission of the plurality of SRS transmissions during a second SRS occasion of the plurality of SRS occasions, and jointly processing the first SRS transmission and the second SRS transmission to generate an SRS estimate.

In some examples, a base station may include a transceiver, a memory, and a processor coupled to the transceiver and the memory. The processor may be configured to transmit to a user equipment via the transceiver a plurality of SRS configurations that are defined to maintain phase continuity across a plurality of sounding reference signal (SRS) transmissions associated with a plurality of SRS occasions, receive from the user equipment a first SRS transmission of the plurality of SRS transmissions via the transceiver during a first SRS occasion of the plurality of SRS occasions, receive from the user equipment a second SRS transmission of the plurality of SRS transmissions via the transceiver during a second SRS occasion of the plurality of SRS occasions, and jointly process the first SRS transmission and the second SRS transmission to generate an SRS estimate.

In some examples, a base station may include means for transmitting to a user equipment a plurality of SRS configurations that are defined to maintain phase continuity across a plurality of sounding reference signal (SRS) transmissions associated with a plurality of SRS occasions, means for receiving from the user equipment a first SRS transmission of the plurality of SRS transmissions during a first SRS occasion of the plurality of SRS occasions, means for receiving from the user equipment a second SRS transmission of the plurality of SRS transmissions during a second SRS occasion of the plurality of SRS occasions, and means for jointly processing the first SRS transmission and the second SRS transmission to generate an SRS estimate.

In some examples, an article of manufacture for use by a base station includes a non-transitory computer-readable medium having stored therein instructions executable by one or more processors of the base station to transmit to a user equipment a plurality of SRS configurations that are defined to maintain phase continuity across a plurality of sounding reference signal (SRS) transmissions associated with a plurality of SRS occasions, receive from the user equipment a first SRS transmission of the plurality of SRS transmissions during a first SRS occasion of the plurality of SRS occasions, receive from the user equipment a second SRS transmission of the plurality of SRS transmissions during a second SRS occasion of the plurality of SRS occasions, and jointly process the first SRS transmission and the second SRS transmission to generate an SRS estimate.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
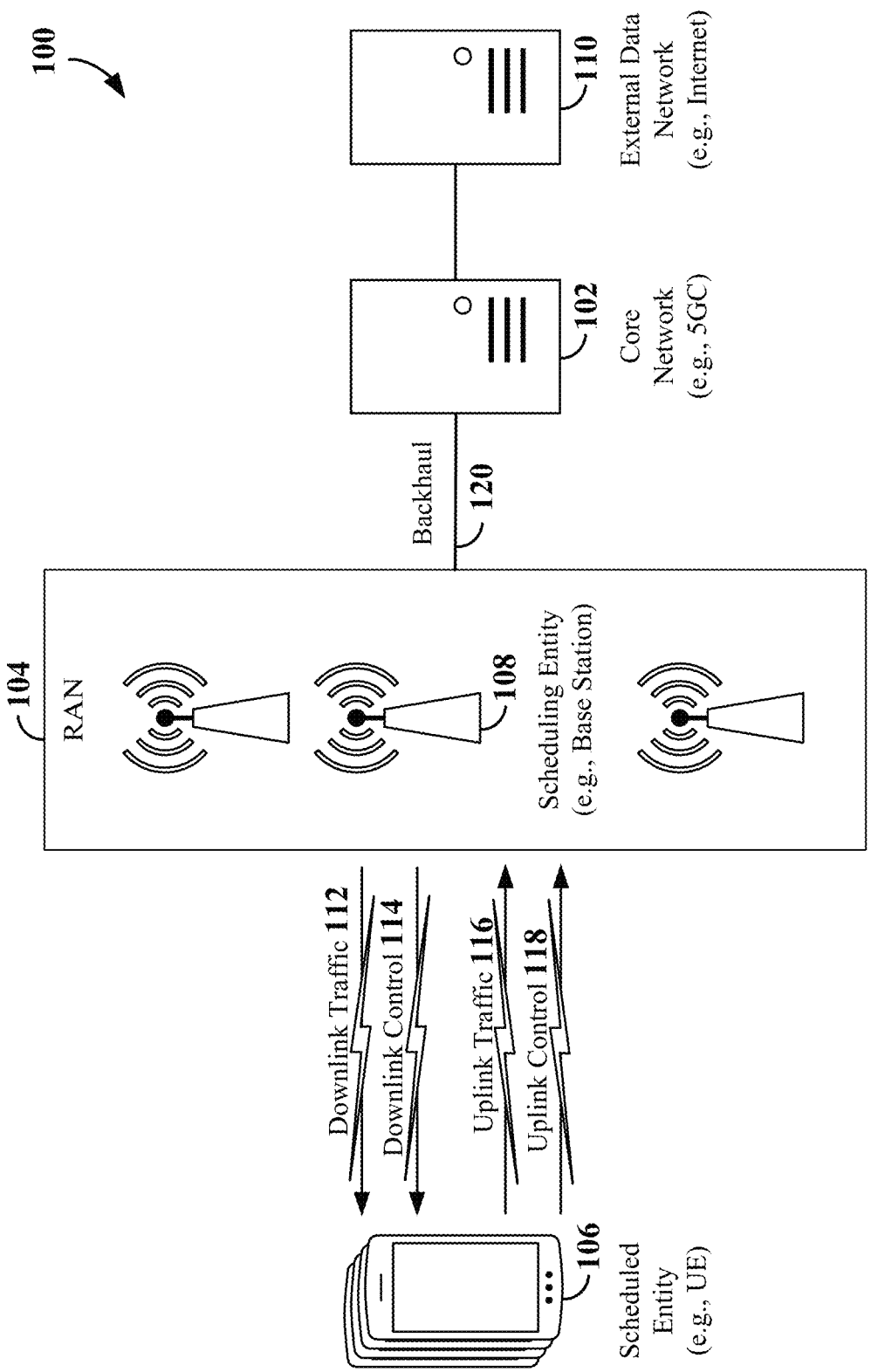
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

A base station may allocate a set of frequency resources to be used by a UE for transmitting SRSs. In some examples, these frequency resources may be wideband resources or resources defined according to a frequency hopping pattern. The base station may allocate resources for SRS transmissions on multiple SRS occasions. In some examples, different SRS occasions may be separated in time by one or more time slots.

The disclosure relates in some aspects to SRS time-domain bundling that enables a base station (or some other receiver of SRS transmissions) to jointly process SRS transmissions over multiple SRS occasions. To facilitate this joint processing, phase continuity may be maintained across the SRS transmissions over multiple SRS occasions in some examples.

In some examples, a UE may expect to be configured with SRS transmissions over multiple SRS occasions where SRS configurations for different SRS transmissions over different SRS occasions specify the same parameters. For example, a first SRS configuration for a first SRS transmission over a first SRS occasion may specify a first set of spatial relation information. In addition, a second SRS configuration for a second SRS transmission over a second SRS occasion may specify that same first set of spatial relation information. In this case, phase continuity may be maintained between the first SRS transmission over the first SRS occasion and the second SRS transmission over the second SRS occasion. Accordingly, a base station that receives the first and second SRS transmissions may jointly process the first and second SRS transmissions to estimate the SRS transmitted by the UE.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink control information 118 and/or downlink control information 114 and/or downlink traffic 112 and/or uplink traffic 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
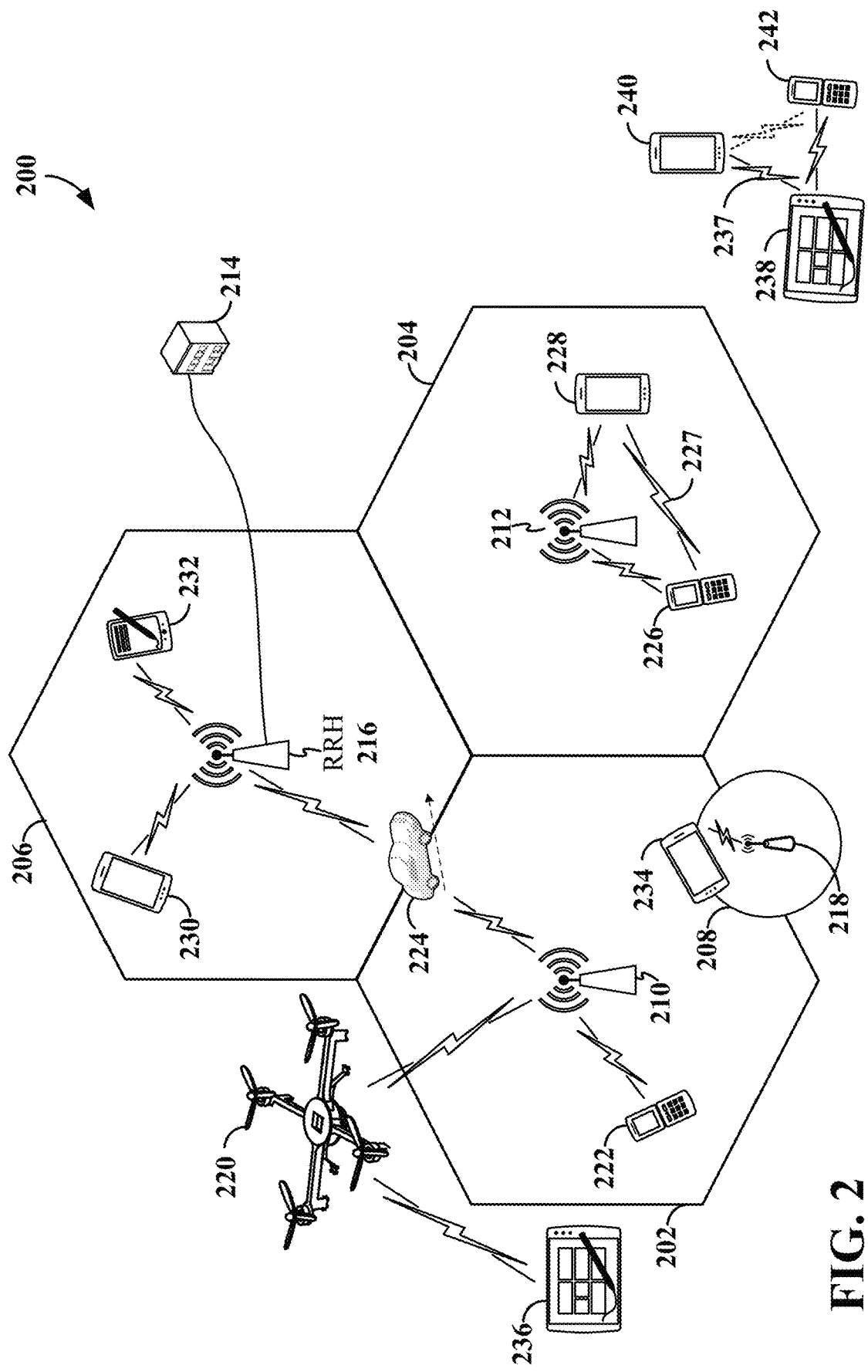
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and the UAV 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with a mobile base station, such as the UAV 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
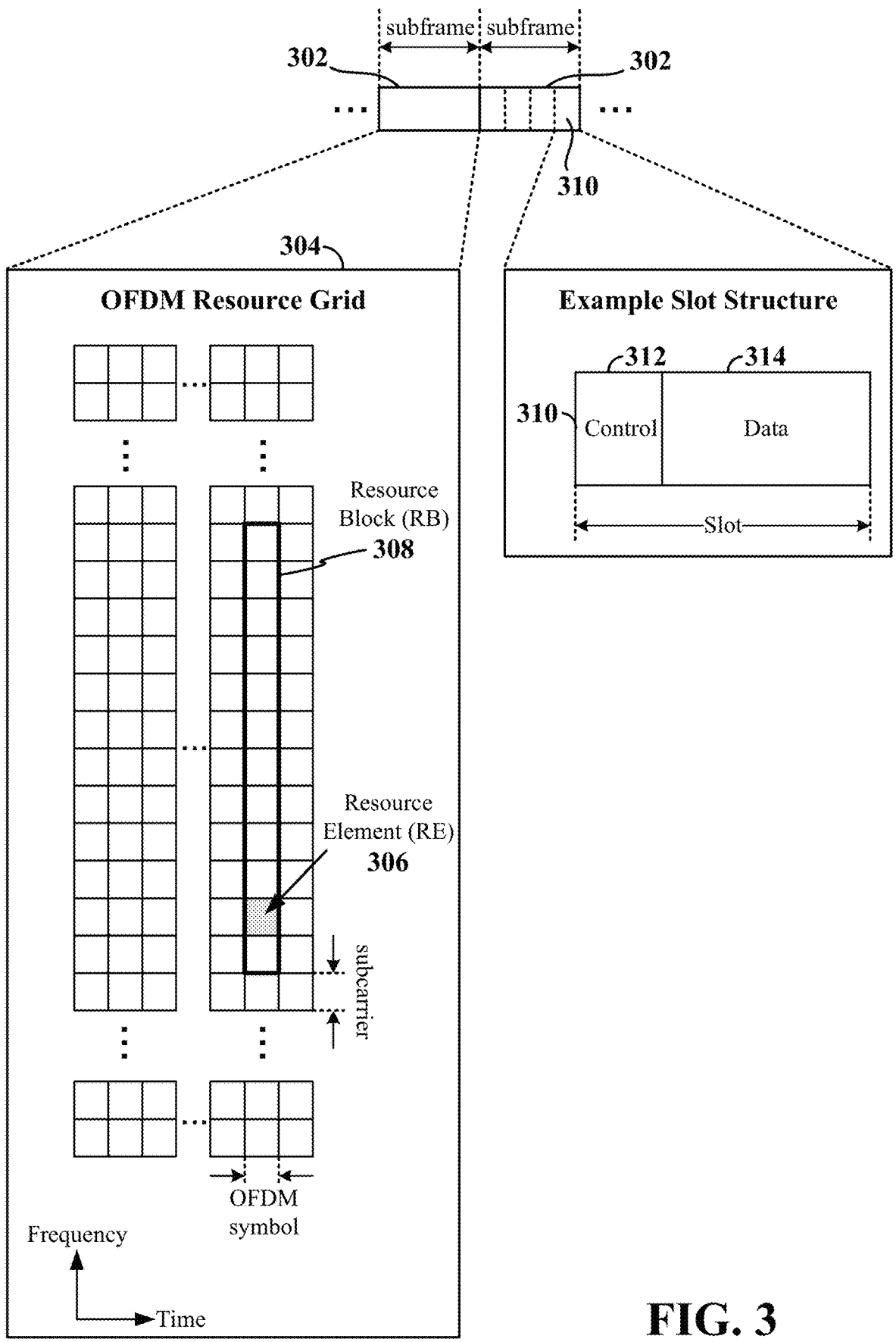
FIG. 3 is a schematic illustration of an example of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

A UE may transmit sounding reference signals (SRSs) that a base station may use for various purposes including, for example, channel estimation, positioning, codebook generation, and beam selection. For example, a UE may transmit SRSs to a base station over a specified bandwidth to enable the base station to estimate the uplink channel over that bandwidth. In this way, the base station may better schedule uplink transmissions from the UE (e.g., the base station may select the frequency band and transmission parameters the UE is to use for an uplink transmission).

A base station may transmit SRS configuration information to a UE that specifies the SRS resources and other parameters to be used by a UE to transmit SRSs. A base station may configure one or more SRS resource sets for a UE. In some examples, a UE may use different resource sets for transmitting on different symbols. A defined number of antenna ports may be used for each SRS resource. In some examples, a given antenna port may correspond to a particular set of antenna elements and/or other beamforming parameters (e.g., signal phases and/or amplitudes).

Figure 4:
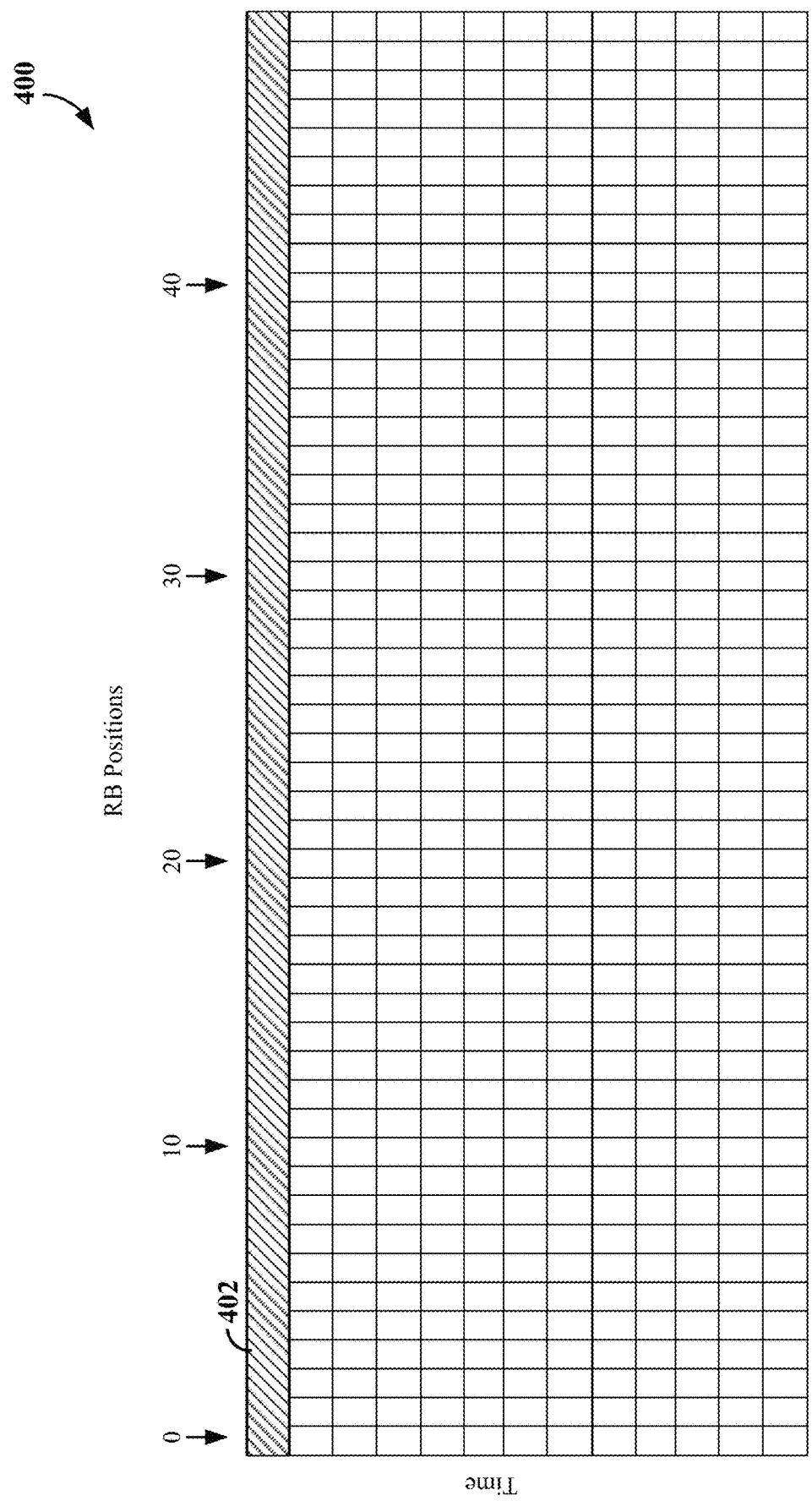
FIG. 4 is a conceptual illustration of an example of a wideband sounding reference signal (SRS) resource allocation according to some aspects.

In some examples, SRS transmissions may be wideband transmissions. For example, as shown in the resource allocation 400 of FIG. 4, an SRS 402 may be transmitted over the entire allocated SRS bandwidth (e.g., 48 RBs in the example of FIG. 4). In FIG. 4, the x-axis represents frequency (e.g., RBs as shown) and the y-axis represents time (e.g., symbols, slots, etc.).

In some examples, SRS transmissions may be sub-band transmissions where an SRS is transmitted over one or more sub-bands of the allocated SRS bandwidth. For example, a UE may use frequency hopping to transmit SRSs over different sub-bands. A base station may configure a hopping scheme for each SRS resource set for a UE. For frequency hopping, the SRS bandwidth may refer to the total bandwidth that will be hopped across all hops (e.g., during a slot, a set of slots, a set of symbols, or some other time span).

Figure 5:
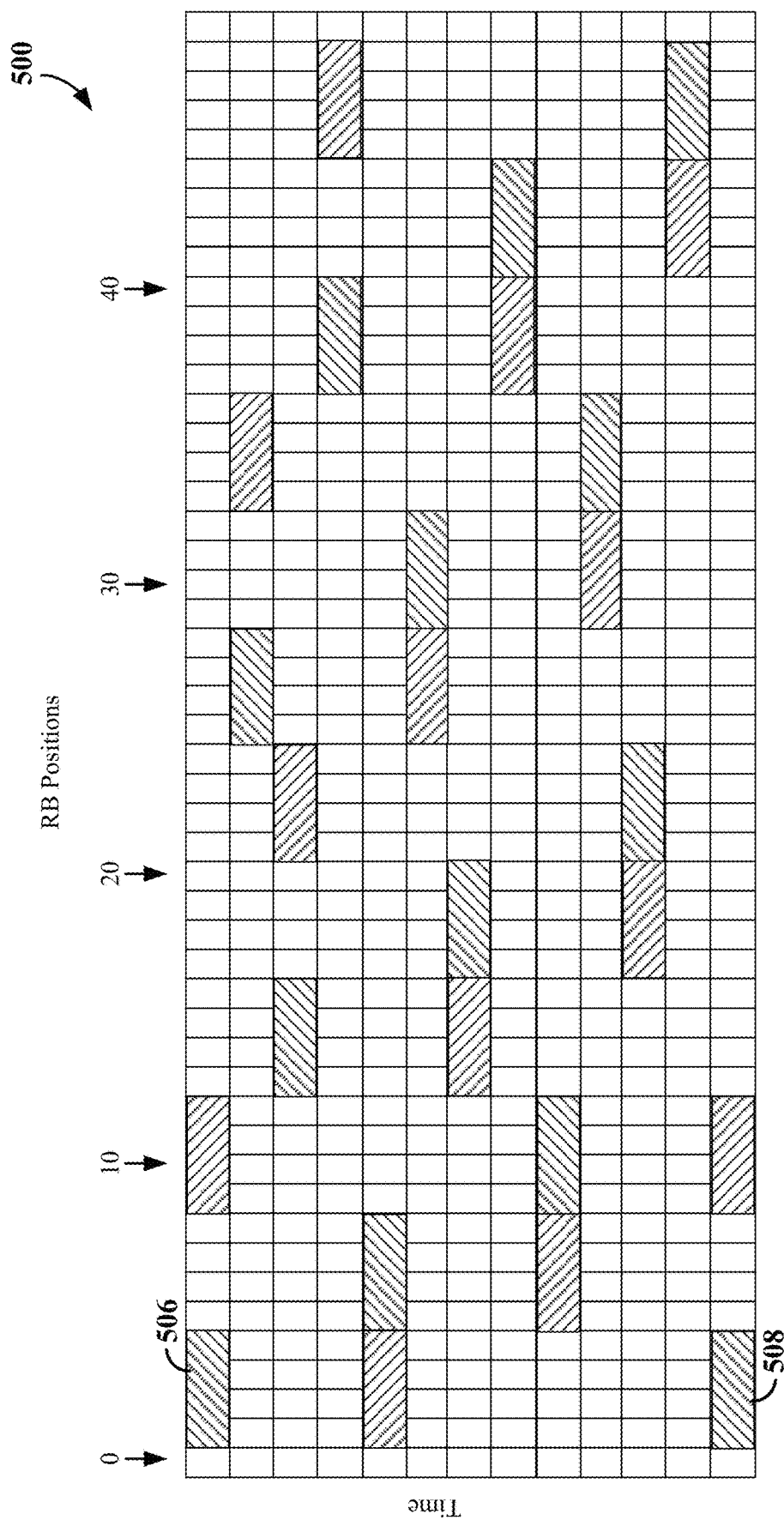
FIG. 5 is a conceptual illustration of an example of an SRS frequency hopping resource allocation according to some aspects.

FIG. 5 illustrates an example of a frequency hopping pattern 500 within which a first hopping sequence 502 for a first UE (UE1) and a second hopping sequence 504 for a second UE (UE2) are defined. For example, a first hop for the first hopping sequence 502 is indicated by a first set of RBs 506, a second hop for the first hopping sequence 502 is indicated by a second set of RBs 508, and so on. In FIG. 5, the x-axis represents frequency (e.g., RBs) and the y-axis represents time (e.g., symbols, slots, etc.).

A base station may send an SRS configuration to a UE that specifies, for example, the SRS bandwidth and SRS hopping bandwidth to be used by the UE for each configured SRS resource set. For example, a set of bandwidth configurations (CSRS) may be defined that specifies, for different values of CSRS, different SRS hopping bandwidth values for different RB groupings (e.g., 4 RBs per hop, 8 RBs per hop, etc.). Thus, a base station may send an SRS bandwidth configuration (e.g., a particular CSRS value) to a UE to configure SRS transmissions by the UE.

Figure 6:
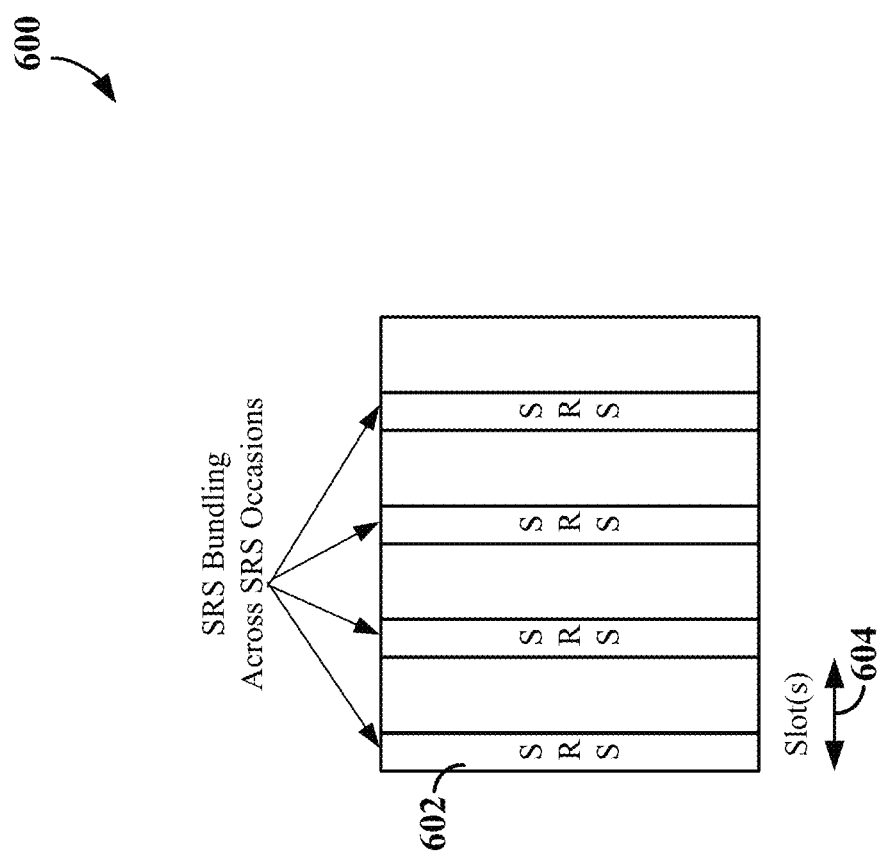
FIG. 6 is a conceptual diagram illustrating an example of SRS bundling according to some aspects.

The disclosure relates in some aspects to SRS time-domain bundling that enables a receiver (e.g., at a base station) to jointly process SRSs transmitted in multiple SRS occasions. FIG. 6 illustrates an example resource allocation 600 for multiple SRS occasions (e.g., including a first SRS occasion 602). A given SRS occasion may occupy one or more time slots (a time slot may be referred to as a slot herein). Also, SRS occasions may be separated in time by one or more slots 604. In some examples, an SRS occasion is a set of time-frequency resources allocated for the transmission of an SRS. Different SRS occasions are separated in the time domain. The time-frequency resources for the SRS 402 of FIG. 4 is one example of an SRS occasion. The time-frequency resources for the first hopping sequence 502 of FIG. 5 is another example of an SRS occasion. Other examples are possible.

When a UE is operating at a cell edge or otherwise subjected to relatively poor channel conditions, it may be difficult for a base station to accurately estimate the SRS transmitted by a UE. However, a base station may be able to generate a better estimate of the SRS by combining SRS information from multiple SRS occasions. For example, as shown in FIG. 6, SRS transmission over four SRS occasions may be bundled to generate an SRS estimate.

A base station may combine SRS transmissions over different SRS occasions in different ways in different examples. In some examples, a base station may combine the waveforms for the different SRS transmissions and generate an estimate of the SRS from the combined waveforms. The combination of the waveforms may be a weighted combination in some examples (e.g., the waveform for one SRS occasion may be weighted differently than the waveform for another SRS occasion). In some examples, a base station may generate a corresponding estimate of the SRS for each of the SRS transmissions from the different SRS occasions and then combine these SRS estimates. The combination of the SRS estimates may be a weighted combination in some examples (e.g., the SRS estimate for one SRS occasion may be weighted differently than the SRS estimate for another SRS occasion).

In view of the above, SRS bundling may be used to provide SRS coverage and capacity enhancements. For example, utilizing the relationship among two or more occasions of one or more SRS resources in one or more slots, joint processing within the time domain may be enabled.

If there is a phase discontinuity (e.g., more than a threshold amount of phase discontinuity) between the SRS transmissions over the SRS occasions, the combination of the SRS transmissions at the base station may be destructive instead of constructive. To facilitate combining (joint processing) of SRS transmissions over multiple SRS occasions at a base station, a transmitter (e.g., at a UE) may be configured to maintain phase coherence/continuity across the SRS transmissions over the SRS occasions.

Phase discontinuity may result from a variety of factors. For example, if there is a non-contiguous time resource allocation for SRS transmissions over different SRS occasions, phase continuity may occur (e.g., due to a time gap between the SRS occasions). As another example, different frequency resource allocations (e.g., different frequency hopping resource allocations or patterns) for SRS transmissions over different SRS occasions may result in phase discontinuity. Also, using different transmit powers for SRS transmissions over different SRS occasions may result in a phase change at the power amplifier. For example, a UE may run a power control loop to control the transmit power of the power amplifier. Different power control loops may result in different phases of the corresponding output waveforms of the power amplifier thereby leading to phase discontinuity. In addition, inaccuracies in determining a correct timing advance value may lead to phase discontinuity. Furthermore, the use of different transmission beams and/or precoders for SRS transmissions over different SRS occasions may lead to phase continuity (e.g., due to different beams having different power control loops, thereby affecting the phase of the power amplifier).

In some examples, a base station may assist a UE in maintaining phase continuity between SRS transmissions over different SRS occasions by configuring the SRS transmissions for the different SRS occasions with identical parameters. Table 1 illustrates an example of an SRS resource allocation.

Within the SRS resource allocation shown in Table 1, the parameters that may affect the phase coherence/discontinuity between SRS transmissions over different SRS occasions may include the number of SRS ports (nrofSRS-Ports) used to transmit an SRS, the transmission comb (transmissionComb) used to transmit the SRS, the frequency domain position (freqDomainPosition) of the SRS, the frequency domain shift (freqDomainShift) of the SRS, the frequency hopping (freqHopping) of the SRS, and the spatial relation information (spatialRelationInfo) for the SRS. These parameters are bolded for emphasis in Table 1.

TABLE 1

```
SRS-Resource ::=                    SEQUENCE {
    Srs-ResourceID                      SRS-ResourceId,
    nrofSRS-Ports                       ENUMERATED {port1, ports2,
ports4},
    Ptrs-PortIndex                      ENUMERATED {n0, n1 }
    transmissionComb                    CHOICE {
        n2                                  SEQUENCE {
            combOffset-n2                       INTEGER (0..1),
            cyclicShift-n2                      INTEGER (0..7)
        },
        n4                                  SEQUENCE {
            combOffset-n4                       INTEGER (0..3),
            cyclicShift-n4                      INTEGER (0.11)
        }
    },
    resourceMapping                     SEQUENCE {
        startPosition                       INTEGER (0..5),
        nrofSymbols                         ENUMERATED {n1, n2, n4},
        repetitionFactor                    ENUMERATED {n1, n2, n4}
    },
    freqDomainPosition                  INTEGER (0..67),
    freqDomainShift                     INTEGER (0...268),
    freqHopping                         SEQUENCE {
        c-SRS                               INTEGER (0..63),
        b-SRS                           INTEGER (0..3),
        B-hop                           INTEGER (0..3)
    },
    groupOrSequenceHopping              ENUMERATED {neither, groupHopping,
                                                    sequenceHopping
    },
    resourceType                        CHOICE {
        aperiodic                           SEQUENCE {
            ...
        },
        semi-persistent                     SEQUENCE {
            periodicityAndOffset-sp             SRS-PeriodicityAndOffset,
            ...
        },
```

TABLE 1-continued

```
    periodic              SEQUENCE {
        periodictyAndOffset-p        SRS-PeriodictyAndOffset,
        ...
    }
},
sequenceId              INTEGER (0..1023),
spatialRelationInfo     SRS-SpatialRelationInfo
    ...
}
```

The number of SRS ports (nrofSRS-Ports) parameter specifies the number of ports to be used for an SRS transmission. If different numbers of SRS ports (nrofSRS-Ports) are used for SRS transmissions over different SRS occasions, phase discontinuity may occur due to a power amplifier operating at different operating points (e.g., the power amplifier phase may be different when the power amplifier is transmitting on one port versus when the power amplifier is transmitting on one of two ports). As mentioned above, different operating points of the power amplifier may be associated with different phases of the amplified waveform. Thus, by configuring SRS transmissions over different SRS occasions to use the same number of SRS ports, phase discontinuity between the SRS transmissions may be mitigated.

The transmission comb (transmissioncomb) parameter specifies the density of the SRS in the frequency domain. For example, a transmissioncomb value of two may indicate that the SRS is transmitted every two REs, while a transmissioncomb value of four may indicate that the SRS is transmitted every four REs. SRS transmissions over different SRS occasions using different SRS densities in the frequency domain may result in phase discontinuity between the SRS transmissions. Thus, by configuring SRS transmissions over different SRS occasions to use the same transmission comb, this phase discontinuity may be mitigated.

The frequency domain position (freqDomainPosition) parameter specifies where an SRS starts in the frequency domain. SRS transmissions over different SRS occasions using different frequency domain positions may result in phase discontinuity between the SRS transmissions. Thus, by configuring SRS transmissions over different SRS occasions to use the same frequency domain position, this phase discontinuity may be mitigated.

The frequency domain shift (freqDomainShift) parameter specifies the frequency domain shift applied to an SRS waveform. SRS transmissions over different SRS occasions using different frequency domain shifts may result in phase discontinuity between the SRS transmissions. Thus, by configuring SRS transmissions over different SRS occasions to use the same frequency domain shift, this phase discontinuity may be mitigated.

The frequency hopping (freqHopping) information specifies the frequency hopping parameters for an SRS (e.g., SRS bandwidth (b-SRS), SRS hopping bandwidth (b-hop), etc.). SRS transmissions over different SRS occasions using different frequency hopping may result in phase discontinuity between the SRS transmissions. Thus, by configuring SRS transmissions over different SRS occasions to use the same frequency hopping, this phase discontinuity may be mitigated.

The spatial relation information (spatialRelationInfo) is used to select an UL beam for an SRS transmission. In some aspects, the spatial relation information may specify a filter to be applied to generate an SRS UL beam in a desired direction and with a desired beam width. SRS transmissions over different SRS occasions using different beams may result in phase discontinuity between the SRS transmissions (e.g., since different beams may use different power control loops). Thus, by configuring SRS transmissions over different SRS occasions to use the same spatial relation information, this phase discontinuity may be mitigated.

Table 2 illustrates an example of the SRS spatial information of Table 1.

TABLE 2

```
SRS-SpatialRelationInfo ::= SEQUENCE {
    servingCellID       ServCellIndex
    referenceSignal         CHOICE {
        ssb-Index       SSB-Index,
        csi-RS-Index            NZP-CSI-RS-ResourceId,
        srs             SEQUENCE {
            resourceID          SRS-REsourceId
            uplinkBWP           BWP-Id
        }
    }
}
SRS-ResourceID ::=                  INTEGER (0..maxNrofSRS-
                                    Resources-1)
```

In some examples, the spatial relation for an SRS transmission may be configured based on a reference signal (RS), referred to as a reference RS. For example, a set of spatial relation information may be defined for a reference RS. Thus, the spatial relation information for a SRS transmission may be selected from the set of spatial relation information defined for a reference RS. As shown in Table 2, a reference RS may be an SSB, a CSI-RS, or an SRS in some examples.

In some examples, an uplink (UL) transmission configuration indicator (TCI) may be used instead of UL spatial relation information. For example, a base station may configure a UE with a set of TCI states (e.g., via a radio resource control (RRC) message). The base station may then specify a particular TCI state to be used for an SRS transmission (e.g., via a DCI).

Various information may be specified by a given UL TCI state. An UL TCI state may specify parameters for configuring quasi co-location (QCL) relationships between RSs. For example, a QCL may specify a BWP identifier, a reference signal identifier, and a QCL type.

In some examples, to enable SRS time-domain bundling, a UE expects to be configured with SRS transmissions over multiple occasions satisfying one or more conditions. These conditions may involve, for example, the SRS transmissions over multiple occasions having one or more of: the same spatial relation information (e.g., SpatialRelationInfo) or the same UL TCI, the same transmission comb (e.g., transmissionComb), the same number of SRS ports (e.g., nrofSRS-Ports), the same frequency domain position in the same active BWP, the same frequency hopping parameters, the same transmit power, or a combination thereof.

In some examples, if a condition is not satisfied at the UE for SRS transmissions, the UE shall not continue maintaining the phase coherence. In this case, phase coherence can be maintained before a change is indicated, but phase coherence will not be maintained once a configuration is received that does not meet the condition. For example, if there are 4 SRS occasions S0, S1, S2, and S3 and the SRS configurations enable phase continuity of SRS transmissions in S0, S1, and S2, but not S3, the UE will not maintain phase continuity of SRS transmissions from S2 to S3 (as one example).

In some examples, if a condition is not satisfied at the UE for SRS transmissions, the UE shall ignore the change and continue maintaining the phase coherence using the set values before the indicated change. In this case, the UE may treat the change in the configuration as an error and ignore the change in the configuration. For example, if there are 4 SRS occasions S0, S1, S2, and S3 and the SRS configurations enable phase continuity of SRS transmissions in S0, S1, and S2, but not S3, the UE will continue maintaining phase continuity of SRS transmissions from S2 to S3 (as one example) by ignoring parameters (spatial, power, frequency hop or transmit port) configured for S3.

Figure 7:
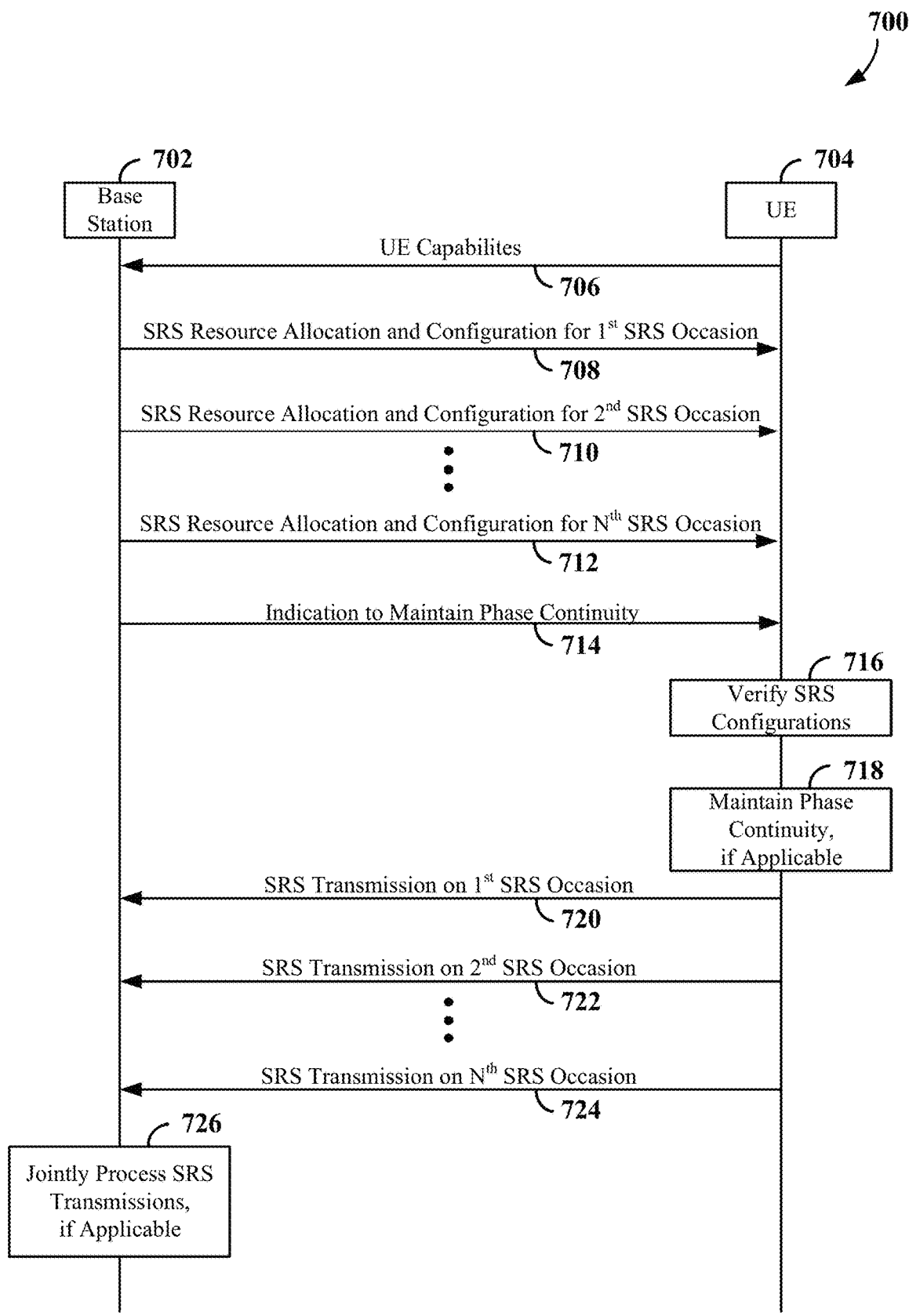
FIG. 7 is a signaling diagram illustrating an example of signaling for SRS transmissions according to some aspects.

FIG. 7 is a signaling diagram 700 illustrating an example of SRS-related signaling in a wireless communication system including a base station (BS) 702 and a UE 704. In some examples, the BS 702 may correspond to any of the base stations or scheduling entities shown in any of FIGS. 1, 2, and 12. In some examples, the UE 704 may correspond to any of the UEs or scheduled entities shown in any of FIGS. 1, 2, and 8.

At 706 of FIG. 7, the UE 704 sends its capability information to the BS 702. This capability information may indicate, for example, that the UE 704 supports SRS time-domain bundling.

Based on this capability information, the BS 702 may determine whether to do time-domain bundling when scheduling the UE 704 to transmit SRSs. For example, if the UE 704 is near a cell edge of the BS 702, the BS 702 may elect to use time-domain bundling to improve the SRS coverage for the UE 704.

At 708-712, the BS 702 may allocate resources for SRS transmissions over multiple SRS occasions and generate an SRS configuration for each SRS transmission. As discussed herein, the BS 702 may generate the SRS configuration so that the same parameters (e.g., spatial relation information, etc.) are defined for the different SRS transmissions over the different SRS occasions. The BS 702 then sends SRS resource allocation information and SRS configurations to the UE 704. The information for different SRS occasions may be sent via different messages in some examples or via the same message in other examples. The BS 702 may send the SRS resource allocation information and SRS configuration information to the UE 704 via a DCI or some other type of signaling.

At 714, the BS 702 sends an indication to the UE 704 that specifies that the UE 704 is to maintain phase continuity across SRS transmissions over different SRS occasions. The BS 702 may send the indication to the UE 704 via a DCI (e.g., a DCI that scheduled the SRS occasions) or some other type of signaling.

At 716, the UE 704 verifies that the SRS configurations received from the BS 702 specify the same parameters (e.g., spatial relation information, etc.) for the SRS transmissions over the different SRS occasions. In this way, if applicable, the UE may maintain phase continuity across SRS transmissions over different SRS occasions (at 718) when the UE 704 transmits the SRS transmissions on the SRS occasions at 720-724. In some examples, the UE 704 may attempt to maintain a constant transmit power across the SRS transmissions over the scheduled SRS occasions to maintain the phase continuity.

At 726, the BS 702 may jointly process the SRS transmissions sent at 720-724. For example, the BS 702 may combine the SRS transmissions to estimate the SRS transmitted by the UE 704.

Figure 8:
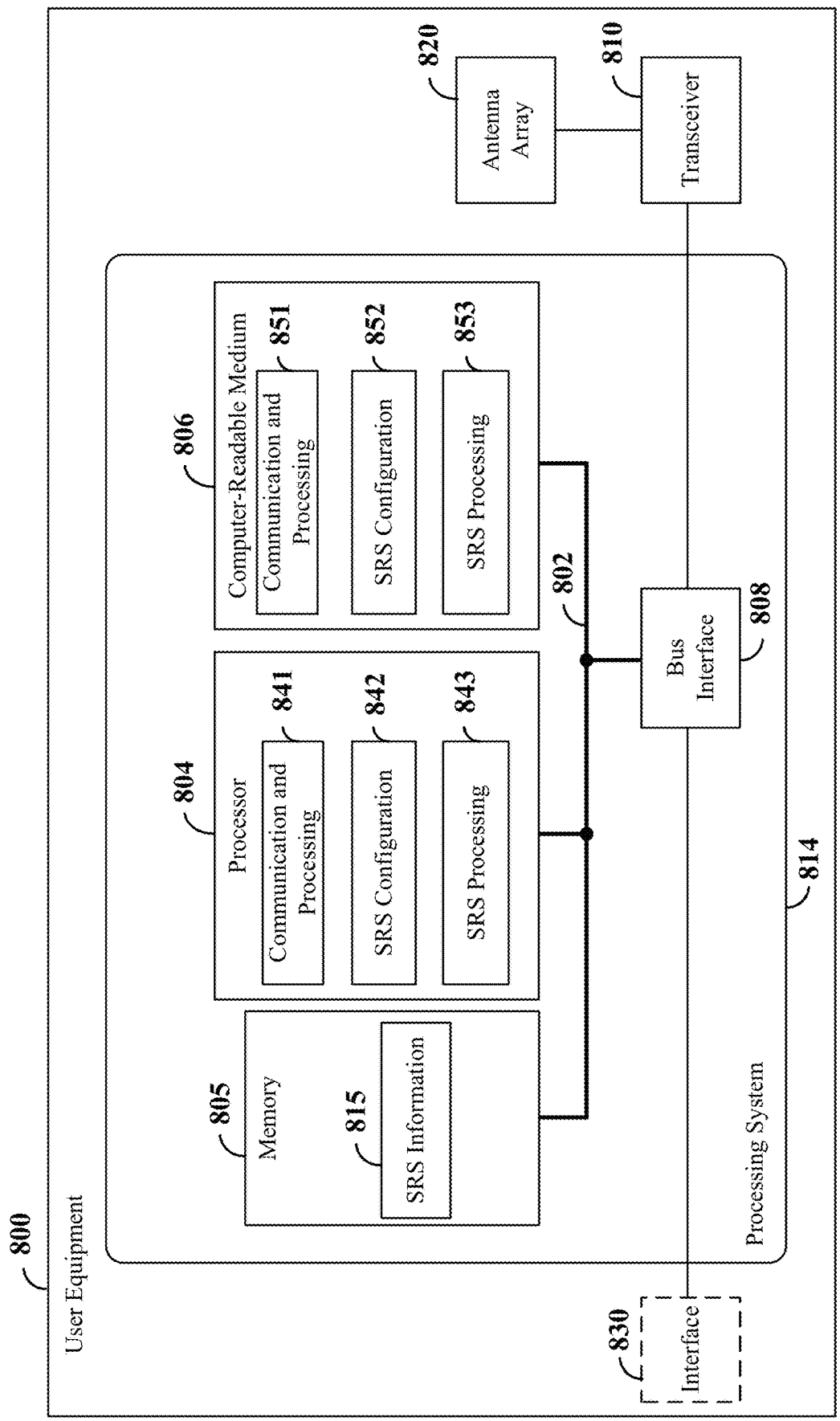
FIG. 8 is a block diagram illustrating an example of a hardware implementation for a user equipment employing a processing system according to some aspects.

FIG. 8 is a block diagram illustrating an example of a hardware implementation for a UE 800 employing a processing system 814. For example, the UE 800 may be a device configured to wirelessly communicate with a base station, as discussed in any one or more of FIGS. 1-7. In some implementations, the UE 800 may correspond to any of the UEs or scheduled entities shown in any of FIGS. 1, 2, and 7.

In accordance with various aspects of the disclosure, an element, or any portion of an element, or any combination of elements may be implemented with the processing system 814. The processing system 814 may include one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 800 may be configured to perform any one or more of the functions described herein. That is, the processor 804, as utilized in a UE 800, may be used to implement any one or more of the processes and procedures described herein.

The processor 804 may in some instances be implemented via a baseband or modem chip and in other implementations, the processor 804 may itself comprise a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810 and between the bus 802 and an interface 830. The transceiver 810 provides a communication interface or means for communicating with various other apparatus over a wireless transmission medium. In some examples, the UE may include two or more transceivers 810, each configured to communicate with a respective network type. The interface 830 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 830 may include a user interface (e.g., keypad, display, speaker, microphone, joystick). Of course, such a user interface is optional, and may be omitted in some examples, such as an IoT device.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software. For example, the memory 805 may include SRS information 815 that may be used by the processor 804 for SRS operations as discussed herein.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 800 may be configured to perform any one or more of the operations described herein (e.g., as described above in conjunction with FIGS. 1-7 and as described below in conjunction with FIGS. 9-11). In some aspects of the disclosure, the processor 804, as utilized in the UE 800, may include circuitry configured for various functions.

The processor 804 may include communication and processing circuitry 841. The communication and processing circuitry 841 may be configured to communicate with a base station, such as a gNB. The communication and processing circuitry 841 may include one or more hardware components that provide the physical structure that performs various processes related to wireless communication (e.g., signal reception and/or signal transmission) as described herein. The communication and processing circuitry 841 may further include one or more hardware components that provide the physical structure that performs various processes related to signal processing (e.g., processing a received signal and/or processing a signal for transmission) as described herein. In some examples, the communication and processing circuitry 841 may include two or more transmit/receive chains, each configured to process signals in a different RAT (or RAN) type. The communication and processing circuitry 841 may further be configured to execute communication and processing software 851 included on the computer-readable medium 806 to implement one or more functions described herein.

In some examples, the communication and processing circuitry 841 may be configured to receive and process downlink beamformed signals at a mmWave frequency or a sub-6 GHz frequency via the transceiver 810 and an antenna array 820. For example, the communication and processing circuitry 841 may be configured to receive a respective reference signal (e.g., SSB or CSI-RS) on each of a plurality of downlink beams from the base station during a downlink beam sweep via at least one first antenna panel of the antenna array 820. The communication and processing circuitry 841 may further be configured to transmit a beam measurement report to the base station.

In some examples, the communication and processing circuitry 841 may further be configured to generate and transmit uplink beamformed signals at a mmWave frequency or a sub-6 GHz frequency via the transceiver 810 and the antenna array 820. For example, the communication and processing circuitry 841 may be configured to transmit a respective reference signal (e.g., SRS or DMRS) on each of a plurality of uplink beams to the base station during an uplink beam sweep via at least one second antenna panel of the antenna array 820.

The communication and processing circuitry 841 may further be configured to generate and transmit a message to the base station. For example, the message may be included in a MAC-CE carried in a PUSCH, UCI in a PUCCH or PUSCH, a random access message, or an RRC message. The communication and processing circuitry 841 may further be configured to generate and transmit a scheduling request (e.g., via UCI in a PUCCH) to the base station to receive an uplink grant for the PUSCH.

The communication and processing circuitry 841 may further be configured to generate and transmit an uplink signal on one or more uplink transmit beams applied to the uplink signal. The uplink signal may include, for example, a PUCCH, PUSCH, SRS, DMRS, or a physical random access channel (PRACH).

The communication and processing circuitry 841 may further be configured to control the antenna array 820 and the transceiver 810 to search for and identify a plurality of downlink transmit beams during a downlink beam sweep. The communication and processing circuitry 841 may further be configured to obtain a plurality of beam measurements on each of a plurality of downlink receive beams via the antenna array 820 for each of the identified downlink transmit beams. The communication and processing circuitry 841 may further be configured to generate a beam measurement report for transmission to the base station using the communication and processing circuitry 841.

The communication and processing circuitry 841 may further be configured to identify one or more selected uplink beam(s) based on the beam measurements obtained from the downlink beam reference signals. In some examples, the communication and processing circuitry 841 may be configured to compare the respective RSRP (or other beam measurement) measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 841 may be configured to generate one or more uplink transmit beams for transmission in an uplink beam sweep. Each uplink transmit beam may carry an uplink reference signal (e.g., an SRS) for measurement by the base station. The communication and processing circuitry 841 may further be configured to identify the selected uplink transmit beam(s) selected by the base station based on the uplink beam measurements. For example, the communication and processing circuitry 841 may be configured to receive an indication of the selected uplink transmit beam(s) from the base station.

In some implementations where the communication involves receiving information, the communication and processing circuitry 841 may obtain information from a component of the UE 800 (e.g., from the transceiver 810 that receives the information via radio frequency signaling or some other type of signaling suitable for the applicable communication medium), process (e.g., decode) the information, and output the processed information. For example, the communication and processing circuitry 841 may output the information to another component of the processor 804, to the memory 805, or to the bus interface 808. In some examples, the communication and processing circuitry 841 may receive one or more of signals, messages, other information, or any combination thereof. In some examples, the communication and processing circuitry 841 may receive information via one or more channels. In some examples, the communication and processing circuitry 841 may include functionality for a means for receiving. In some examples, the communication and processing circuitry 841 may include functionality for a means for decoding.

In some implementations where the communication involves sending (e.g., transmitting) information, the communication and processing circuitry 841 may obtain information (e.g., from another component of the processor 804, the memory 805, or the bus interface 808), process (e.g., encode) the information, and output the processed information. For example, the communication and processing circuitry 841 may output the information to the transceiver 810 (e.g., that transmits the information via radio frequency signaling or some other type of signaling suitable for the applicable communication medium). In some examples, the communication and processing circuitry 841 may send one or more of signals, messages, other information, or any combination thereof. In some examples, the communication and processing circuitry 841 may send information via one or more channels. In some examples, the communication and processing circuitry 841 may include functionality for a means for sending (e.g., a means for transmitting). In some examples, the communication and processing circuitry 841 may include functionality for a means for encoding.

The processor 804 may include SRS configuration circuitry 842 configured to perform SRS configuration-related operations as discussed herein (e.g., one or more of the operations described in conjunction with FIGS. 6 and 7). The SRS configuration circuitry 842 may be configured to execute SRS configuration software 852 included on the computer-readable medium 806 to implement one or more functions described herein.

Figure 9:
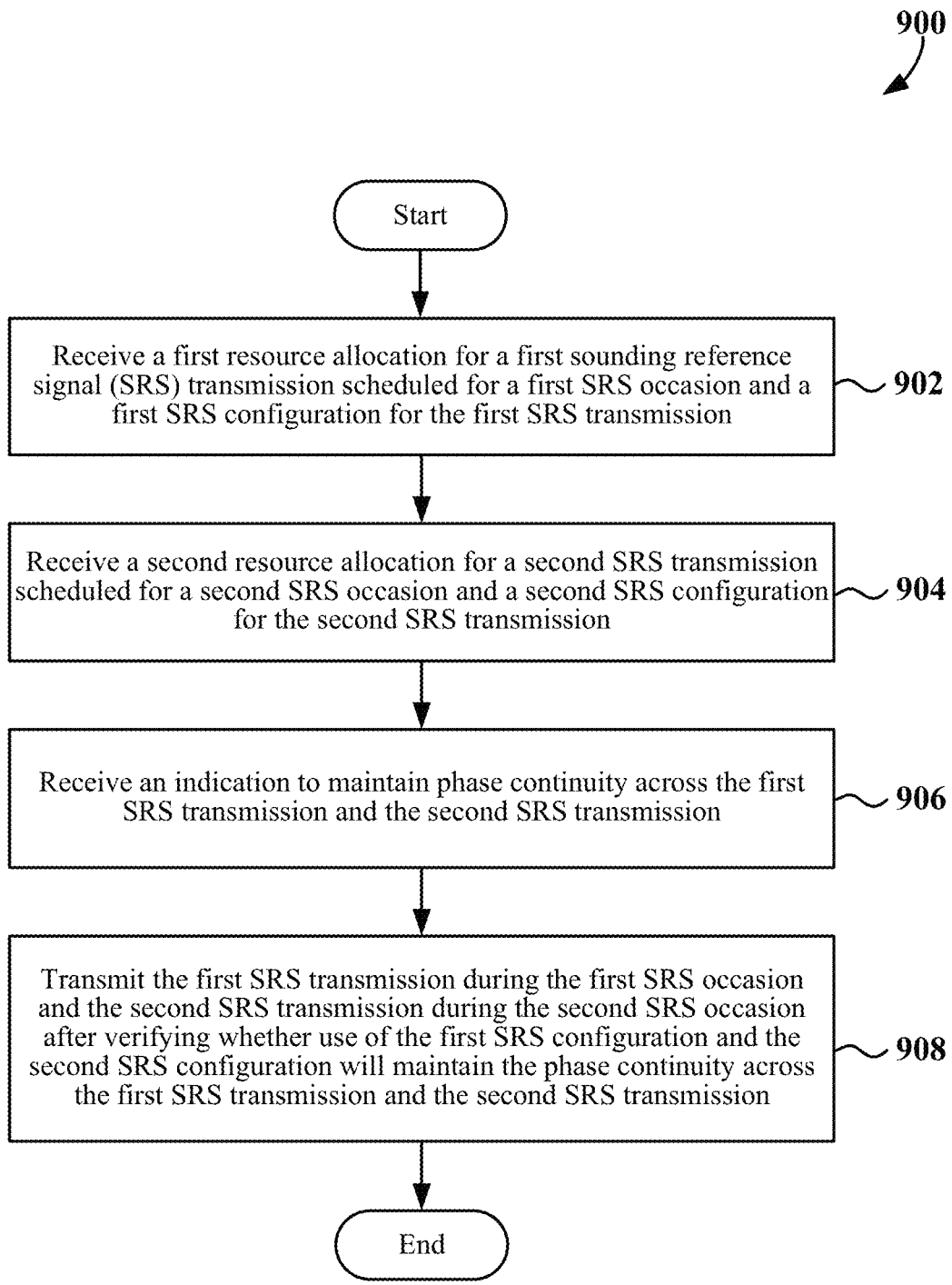
FIG. 9 is a flow chart of a first example SRS transmission method according to some aspects.
Figure 10:
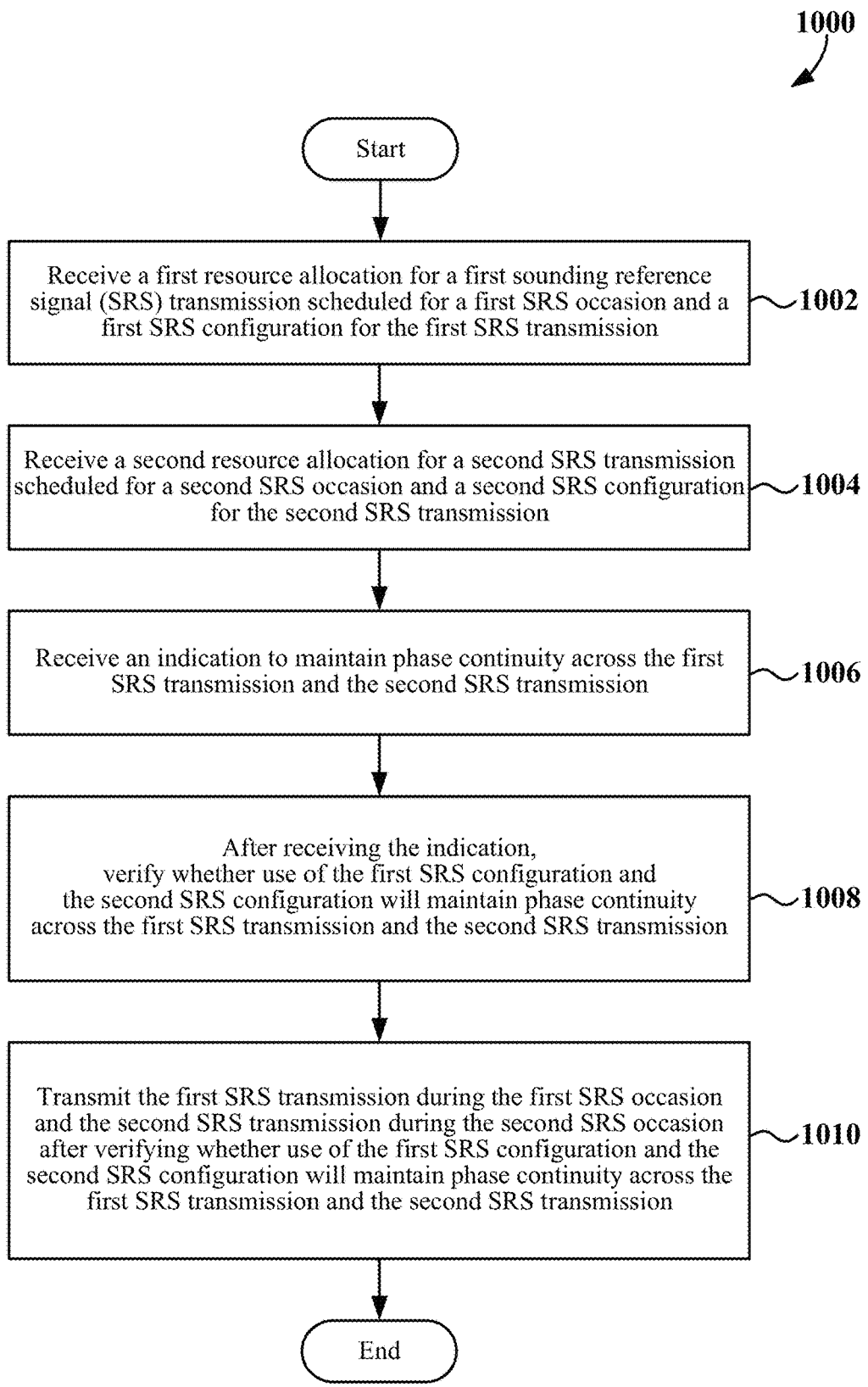
FIG. 10 is a flow chart of a second example SRS transmission method according to some aspects.
Figure 11:
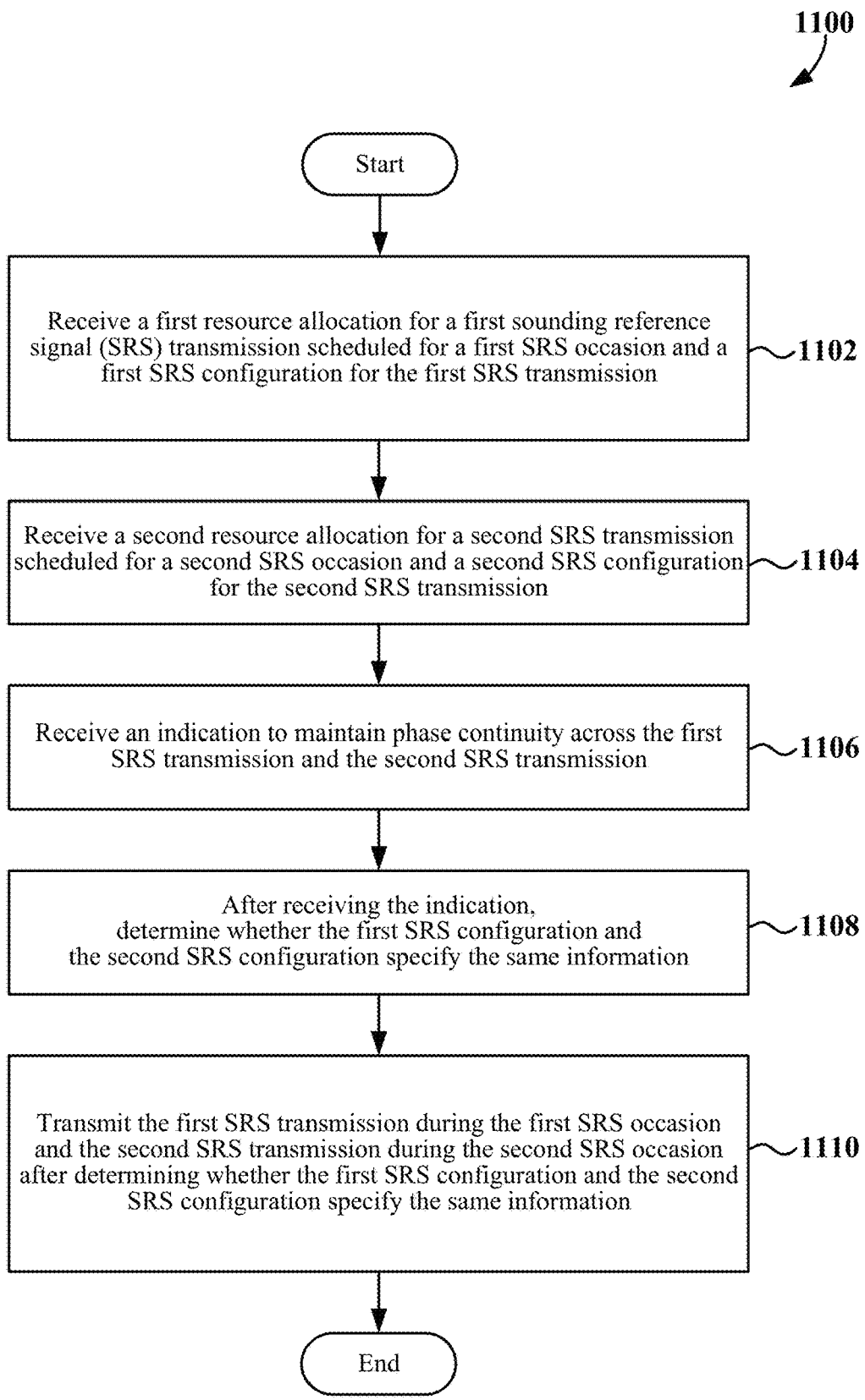
FIG. 11 is a flow chart of a third example SRS transmission method according to some aspects.

The SRS configuration circuitry 842 may include functionality for a means for receiving (e.g., as described at 708, 710, 712, and/or 714 of FIG. 7 and/or block 902, 904, and/or 906 of FIG. 9 and/or block 1002, 1004, and/or 1006 of FIG. 10 and/or block 1102, 1104, and/or 1106 of FIG. 11). For example, the SRS configuration circuitry 842 together with the communication and processing circuitry 841 and the transceiver 810 may receive a message on a PDCCH including resource allocation and configuration information. As another example, the SRS configuration circuitry 842 together with the communication and processing circuitry 841 and the transceiver 810 may receive a message on a PDSCH that includes an indication.

The SRS configuration circuitry 842 may include functionality for a means for verifying (e.g., as described at 716 of FIG. 7 and/or block 908 of FIG. 9 and/or block 1008 of FIG. 10 and/or block 1108 of FIG. 11). For example, the SRS configuration circuitry 842 may verify whether the same parameters have been configured for first and second SRS transmissions.

The SRS configuration circuitry 842 may include functionality for a means for determining (e.g., as described at 716 of FIG. 7 and/or block 1108 of FIG. 11). For example, the SRS configuration circuitry 842 may determine whether the same parameters have been configured for first and second SRS transmissions.

The processor 804 may include SRS processing circuitry 843 configured to perform SRS processing-related operations as discussed herein (e.g., one or more of the operations described in conjunction with FIGS. 6 and 7). The SRS processing circuitry 843 may be configured to execute SRS processing software 853 included on the computer-readable medium 806 to implement one or more functions described herein.

The SRS processing circuitry 843 may include functionality for a means for generating SRS. For example, the SRS processing circuitry 843 may generate an SRS sequence using a sequence generating algorithm.

The SRS processing circuitry 843 may include functionality for a means for transmitting SRS (e.g., as described at 720, 722, and/or 724 of FIG. 7 and/or block 908 of FIG. 9 and/or block 1010 of FIG. 10 and/or block 1110 of FIG. 11). For example, the SRS processing circuitry 843 together with the communication and processing circuitry 841 and the transceiver 810, shown and described above in connection with FIG. 8, may transmit the SRS transmissions on scheduled uplink resources.

FIG. 9 is a flow chart illustrating an example method 900 for wireless communication in accordance with some aspects of the present disclosure. As described below, some or all illustrated features may be omitted in a particular implementation within the scope of the present disclosure, and some illustrated features may not be required for implementation of all examples. In some examples, the method 900 may be carried out by the UE 800 illustrated in FIG. 8. In some examples, the method 900 may be carried out by any suitable apparatus or means for carrying out the functions or algorithm described below.

At block 902, a UE may receive a first resource allocation for a first sounding reference signal (SRS) transmission scheduled for a first SRS occasion and a first SRS configuration for the first SRS transmission. For example, the SRS configuration circuitry 842 together with the communication and processing circuitry 841 and the transceiver 810, shown and described above in connection with FIG. 8, may provide a means to receive a first resource allocation for a first sounding reference signal (SRS) transmission scheduled for a first SRS occasion and a first SRS configuration for the first SRS transmission.

In some examples, the first SRS occasion corresponds to at least one first time slot, and the second SRS occasion corresponds to at least one second time slot that is different from the at least one first time slot.

At block 904, the UE may receive a second resource allocation for a second SRS transmission scheduled for a second SRS occasion and a second SRS configuration for the second SRS transmission. For example, the SRS configuration circuitry 842 together with the communication and processing circuitry 841 and the transceiver 810 may provide a means to receive a second resource allocation for a second SRS transmission scheduled for a second SRS occasion and a second SRS configuration for the second SRS transmission.

In some examples, receiving the first resource allocation and receiving the second resource allocation may include receiving at least one downlink control information (DCI) from a base station, and the at least one DCI specifies that the user equipment is to use the first SRS configuration for the first SRS transmission during the first SRS occasion and that the user equipment is to use the second SRS configuration for the second SRS transmission during the second SRS occasion.

At block 906, the UE may receive an indication to maintain phase continuity across the first SRS transmission and the second SRS transmission. For example, the SRS configuration circuitry 842 together with the communication and processing circuitry 841 and the transceiver 810 may provide a means to receive an indication to maintain phase continuity across the first SRS transmission and the second SRS transmission.

In some examples, receiving the indication may include receiving a medium access control—control element (MAC-CE) that includes the indication.

At block 908, the UE may transmit the first SRS transmission during the first SRS occasion and the second SRS transmission during the second SRS occasion after verifying whether use of the first SRS configuration and the second SRS configuration will maintain the phase continuity across the first SRS transmission and the second SRS transmission. For example, the SRS processing circuitry 843 together with the communication and processing circuitry 841 and the transceiver 810, shown and described above in connection with FIG. 8, may provide a means to transmit the first SRS transmission during the first SRS occasion and the second SRS transmission during the second SRS occasion.

In some examples, verifying whether use of the first SRS configuration and the second SRS configuration will maintain the phase continuity across the first SRS transmission and the second SRS transmission may include determining that use of the first SRS configuration and the second SRS configuration will maintain the phase continuity across the first SRS transmission and the second SRS transmission. In some examples, transmitting the first SRS transmission during the first SRS occasion and the second SRS transmission during the second SRS occasion may include transmitting the first SRS transmission according to the first SRS configuration and transmitting the second SRS transmission according to the second SRS configuration, maintaining the phase continuity across the first SRS transmission and the second SRS transmission. In some examples, maintaining the phase continuity across the first SRS transmission and the second SRS transmission may include maintaining substantially the same phase continuity (e.g., power amplifier phase) across the first SRS transmission and the second SRS transmission.

In some examples, verifying whether use of the first SRS configuration and the second SRS configuration will maintain the phase continuity across the first SRS transmission and the second SRS transmission may include determining that use of the first SRS configuration and the second SRS configuration will not maintain the phase continuity across the first SRS transmission and the second SRS transmission. In some examples, transmitting the first SRS transmission during the first SRS occasion and the second SRS transmission during the second SRS occasion may include transmitting the first SRS transmission according to the first SRS configuration, transmitting the second SRS transmission according to the second SRS configuration, and abstaining from maintaining the phase continuity across the first SRS transmission and the second SRS transmission. In some examples, transmitting the first SRS transmission during the first SRS occasion and the second SRS transmission during the second SRS occasion may include transmitting the first SRS transmission and transmitting the second SRS transmission, maintaining the phase continuity across the first SRS transmission and the second SRS transmission.

In some examples, verifying whether the use of the first SRS configuration and the second SRS configuration will maintain the phase continuity across the first SRS transmission and the second SRS transmission may include determining whether the first SRS configuration and the second SRS configuration specify at least one of the same spatial relation information, the same uplink transmission configuration indicator state, the same transmission comb, the same number of SRS ports, the same frequency domain position in the same bandwidth part, the same frequency hop parameters, the same transmit power, or a combination thereof.

In some examples, the first SRS configuration specifies a first set of spatial relation information, the second SRS configuration specifies a second set of spatial relation information, and verifying whether the use of the first SRS configuration and the second SRS configuration will maintain the phase continuity across the first SRS transmission and the second SRS transmission may include determining whether the first set of spatial relation information and the second set of spatial relation information specify at least one of the same serving cell identifier, the same synchronization signal block index, the same channel state information reference signal index, the same SRS resource identifier, the same uplink bandwidth part, or a combination thereof.

In some examples, verifying whether the use of the first SRS configuration and the second SRS configuration will maintain the phase continuity across the first SRS transmission and the second SRS transmission may include determining whether the first SRS configuration specifies a first uplink transmission configuration indicator state, and the second SRS configuration specifies the first uplink transmission configuration indicator state.

In some examples, verifying whether the use of the first SRS configuration and the second SRS configuration will maintain the phase continuity across the first SRS transmission and the second SRS transmission may include determining whether the first SRS configuration specifies a first number of ports, and the second SRS configuration specifies the first number of ports.

In some examples, verifying whether the use of the first SRS configuration and the second SRS configuration will maintain the phase continuity across the first SRS transmission and the second SRS transmission may include determining whether the first SRS configuration specifies a first transmission comb value, and the second SRS configuration specifies the first transmission comb value.

In some examples, verifying whether the use of the first SRS configuration and the second SRS configuration will maintain the phase continuity across the first SRS transmission and the second SRS transmission may include determining whether the first SRS configuration specifies a first frequency domain position, and the second SRS configuration specifies the first frequency domain position.

In some examples, verifying whether the use of the first SRS configuration and the second SRS configuration will maintain the phase continuity across the first SRS transmission and the second SRS transmission may include determining whether the first SRS configuration specifies a first frequency hopping configuration value, and the second SRS configuration specifies the first frequency hopping configuration value.

In some examples, verifying whether the use of the first SRS configuration and the second SRS configuration will maintain the phase continuity across the first SRS transmission and the second SRS transmission may include determining whether the first SRS configuration specifies a first SRS bandwidth and a first SRS hopping bandwidth, and the second SRS configuration specifies the first SRS bandwidth and the first SRS hopping bandwidth.

In some examples, verifying whether the use of the first SRS configuration and the second SRS configuration will maintain the phase continuity across the first SRS transmission and the second SRS transmission may include determining whether the first SRS configuration specifies a first transmit power configuration, and the second SRS configuration specifies the first transmit power configuration.

In some examples, the UE may transmit capability information to a base station, wherein the capability information indicates that the user equipment supports maintaining phase continuity across SRS transmissions for different SRS occasions. In some examples, receiving the indication may include receiving the indication after transmitting the capability information.

FIG. 10 is a flow chart illustrating an example method 1000 for wireless communication in accordance with some aspects of the present disclosure. As described below, some or all illustrated features may be omitted in a particular implementation within the scope of the present disclosure, and some illustrated features may not be required for implementation of all examples. In some examples, the method 1000 may be carried out by the UE 800 illustrated in FIG. 8. In some examples, the method 1000 may be carried out by any suitable apparatus or means for carrying out the functions or algorithm described below.

At block 1002, a UE may receive a first resource allocation for a first sounding reference signal (SRS) transmission scheduled for a first SRS occasion and a first SRS configuration for the first SRS transmission. For example, the SRS configuration circuitry 842 together with the communication and processing circuitry 841 and the transceiver 810, shown and described above in connection with FIG. 8, may provide a means to receive a first resource allocation for a first sounding reference signal (SRS) transmission scheduled for a first SRS occasion and a first SRS configuration for the first SRS transmission.

In some examples, the first SRS occasion corresponds to at least one first time slot, and the second SRS occasion corresponds to at least one second time slot that is different from the at least one first time slot.

At block 1004, the UE may receive a second resource allocation for a second SRS transmission scheduled for a second SRS occasion and a second SRS configuration for the second SRS transmission. For example, the SRS configuration circuitry 842 together with the communication and processing circuitry 841 and the transceiver 810 may provide a means to receive a second resource allocation for a second SRS transmission scheduled for a second SRS occasion and a second SRS configuration for the second SRS transmission.

In some examples, to receive the first resource allocation and receive the second resource allocation, the UE may receive at least one downlink control information (DCI) from a base station, wherein the at least one DCI specifies that the user equipment is to use the first SRS configuration for the first SRS transmission during the first SRS occasion and that the user equipment is to use the second SRS configuration for the second SRS transmission during the second SRS occasion.

At block 1006, the UE may receive an indication to maintain phase continuity across the first SRS transmission and the second SRS transmission. For example, the SRS configuration circuitry 842 together with the communication and processing circuitry 841 and the transceiver 810 may provide a means to receive an indication to maintain phase continuity across the first SRS transmission and the second SRS transmission.

In some examples, receiving the indication may include receiving a medium access control—control element (MAC-CE) that includes the indication.

At block 1008, the UE may, after receiving the indication at block 1006, verify whether use of the first SRS configuration and the second SRS configuration will maintain phase continuity across the first SRS transmission and the second SRS transmission. For example, the SRS configuration circuitry 842 may provide a means to verify whether use of the first SRS configuration and the second SRS configuration will maintain phase continuity across the first SRS transmission and the second SRS transmission.

At block 1010, the UE may transmit the first SRS transmission during the first SRS occasion and the second SRS transmission during the second SRS occasion after verifying whether use of the first SRS configuration and the second SRS configuration will maintain phase continuity across the first SRS transmission and the second SRS transmission. For example, the SRS processing circuitry 843 together with the communication and processing circuitry 841 and the transceiver 810, shown and described above in connection with FIG. 8, may provide a means to transmit the first SRS transmission during the first SRS occasion and the second SRS transmission during the second SRS occasion.

In some examples, verifying whether use of the first SRS configuration and the second SRS configuration will maintain phase continuity across the first SRS transmission and the second SRS transmission may include determining that use of the first SRS configuration and the second SRS configuration will maintain phase continuity across the first SRS transmission and the second SRS transmission. In some examples, transmitting the first SRS transmission during the first SRS occasion and the second SRS transmission during the second SRS occasion may include transmitting the first SRS transmission according to the first SRS configuration and transmitting the second SRS transmission according to the second SRS configuration, maintaining phase continuity across the first SRS transmission and the second SRS transmission. In some examples, maintaining phase continuity across the first SRS transmission and the second SRS transmission may include maintaining substantially the same phase continuity (e.g., power amplifier phase) across the first SRS transmission and the second SRS transmission.

In some examples, verifying whether use of the first SRS configuration and the second SRS configuration will maintain phase continuity across the first SRS transmission and the second SRS transmission may include determining that use of the first SRS configuration and the second SRS configuration will not maintain phase continuity across the first SRS transmission and the second SRS transmission. In some examples, transmitting the first SRS transmission during the first SRS occasion and the second SRS transmission during the second SRS occasion may include transmitting the first SRS transmission according to the first SRS configuration, transmitting the second SRS transmission according to the second SRS configuration, and abstaining from maintaining phase continuity across the first SRS transmission and the second SRS transmission. In some examples, transmitting the first SRS transmission during the first SRS occasion and the second SRS transmission during the second SRS occasion may include transmitting the first SRS transmission and transmitting the second SRS transmission, maintaining phase continuity across the first SRS transmission and the second SRS transmission.

In some examples, verifying whether the use of the first SRS configuration and the second SRS configuration will maintain phase continuity across the first SRS transmission and the second SRS transmission may include determining whether the first SRS configuration and the second SRS configuration specify at least one of the same spatial relation information, the same uplink transmission configuration indicator state, the same transmission comb, the same number of SRS ports, the same frequency domain position in the same bandwidth part, the same frequency hop parameters, the same transmit power, or a combination thereof.

In some examples, the first SRS configuration specifies a first set of spatial relation information, the second SRS configuration specifies a second set of spatial relation information, and verifying whether the use of the first SRS configuration and the second SRS configuration will maintain phase continuity across the first SRS transmission and the second SRS transmission may include determining whether the first set of spatial relation information and the second set of spatial relation information specify at least one of the same serving cell identifier, the same synchronization signal block index, the same channel state information reference signal index, the same SRS resource identifier, the same uplink bandwidth part, or a combination thereof.

In some examples, verifying whether the use of the first SRS configuration and the second SRS configuration will maintain phase continuity across the first SRS transmission and the second SRS transmission may include determining whether the first SRS configuration specifies a first uplink transmission configuration indicator state, and the second SRS configuration specifies the first uplink transmission configuration indicator state.

In some examples, verifying whether the use of the first SRS configuration and the second SRS configuration will maintain phase continuity across the first SRS transmission and the second SRS transmission may include determining whether the first SRS configuration specifies a first number of ports, and the second SRS configuration specifies the first number of ports.

In some examples, verifying whether the use of the first SRS configuration and the second SRS configuration will maintain phase continuity across the first SRS transmission and the second SRS transmission may include determining whether the first SRS configuration specifies a first transmission comb value, and the second SRS configuration specifies the first transmission comb value.

In some examples, verifying whether the use of the first SRS configuration and the second SRS configuration will maintain phase continuity across the first SRS transmission and the second SRS transmission may include determining whether the first SRS configuration specifies a first frequency domain position, and the second SRS configuration specifies the first frequency domain position.

In some examples, verifying whether the use of the first SRS configuration and the second SRS configuration will maintain phase continuity across the first SRS transmission and the second SRS transmission may include determining whether the first SRS configuration specifies a first frequency hopping configuration value, and the second SRS configuration specifies the first frequency hopping configuration value.

In some examples, verifying whether the use of the first SRS configuration and the second SRS configuration will maintain phase continuity across the first SRS transmission and the second SRS transmission may include determining whether the first SRS configuration specifies a first SRS bandwidth and a first SRS hopping bandwidth, and the second SRS configuration specifies the first SRS bandwidth and the first SRS hopping bandwidth.

In some examples, verifying whether the use of the first SRS configuration and the second SRS configuration will maintain phase continuity across the first SRS transmission and the second SRS transmission may include determining whether the first SRS configuration specifies a first transmit power configuration, and the second SRS configuration specifies the first transmit power configuration.

In some examples, the UE may transmit capability information to a base station, wherein the capability information indicates that the user equipment supports maintaining phase continuity across SRS transmissions for different SRS occasions, and wherein receiving the indication may include receiving the indication after transmitting the capability information.

FIG. 11 is a flow chart illustrating an example method 1100 for wireless communication in accordance with some aspects of the present disclosure. As described below, some or all illustrated features may be omitted in a particular implementation within the scope of the present disclosure, and some illustrated features may not be required for implementation of all examples. In some examples, the method 1100 may be carried out by the UE 800 illustrated in FIG. 8. In some examples, the method 1100 may be carried out by any suitable apparatus or means for carrying out the functions or algorithm described below.

At block 1102, a UE may receive a first resource allocation for a first sounding reference signal (SRS) transmission scheduled for a first SRS occasion and a first SRS configuration for the first SRS transmission. For example, the SRS configuration circuitry 842 together with the communication and processing circuitry 841 and the transceiver 810, shown and described above in connection with FIG. 8, may provide a means to receive a first resource allocation for a first sounding reference signal (SRS) transmission scheduled for a first SRS occasion and a first SRS configuration for the first SRS transmission.

At block 1104, the UE may receive a second resource allocation for a second SRS transmission scheduled for a second SRS occasion and a second SRS configuration for the second SRS transmission. For example, the SRS configuration circuitry 842 together with the communication and processing circuitry 841 and the transceiver 810 may provide a means to receive a second resource allocation for a second SRS transmission scheduled for a second SRS occasion and a second SRS configuration for the second SRS transmission.

At block 1106, the UE may receive an indication to maintain phase continuity across the first SRS transmission and the second SRS transmission. For example, the SRS configuration circuitry 842 together with the communication and processing circuitry 841 and the transceiver 810 may provide a means to receive an indication to maintain phase continuity across the first SRS transmission and the second SRS transmission.

At block 1108, the UE may, after receiving the indication at block 1106, determine whether the first SRS configuration and the second SRS configuration specify the same information. For example, the SRS configuration circuitry 842 may provide a means to determine whether the first SRS configuration and the second SRS configuration specify the same information.

At block 1110, the UE may transmit the first SRS transmission during the first SRS occasion and the second SRS transmission during the second SRS occasion after determining whether the first SRS configuration and the second SRS configuration specify the same information. For example, the SRS processing circuitry 843 together with the communication and processing circuitry 841 and the transceiver 810, shown and described above in connection with FIG. 8, may provide a means to transmit the first SRS transmission during the first SRS occasion and the second SRS transmission during the second SRS occasion.

In some examples, determining whether the first SRS configuration and the second SRS configuration specify the same information may include determining whether the first SRS configuration and the second SRS configuration specify at least one of the same spatial relation information, the same uplink transmission configuration indicator state, the same transmission comb, the same number of SRS ports, the same frequency domain position in the same bandwidth part, the same frequency hop parameters, the same transmit power, or a combination thereof.

In some examples, determining whether the first SRS configuration and the second SRS configuration specify the same information may include determining that the first SRS configuration and the second SRS configuration specify the same information, and transmitting the first SRS transmission and the second SRS transmission may include transmitting the first SRS transmission according to the first SRS configuration and transmitting the second SRS transmission according to the second SRS configuration, maintaining phase continuity across the first SRS transmission and the second SRS transmission. In some examples, maintaining phase continuity across the first SRS transmission and the second SRS transmission may include maintaining substantially the same phase continuity (e.g., power amplifier phase) across the first SRS transmission and the second SRS transmission.

In some examples, determining whether the first SRS configuration and the second SRS configuration specify the same information may include determining that the first SRS configuration and the second SRS configuration do not specify the same information, and transmitting the first SRS transmission and the second SRS transmission may include transmitting the first SRS transmission according to the first SRS configuration, transmitting the second SRS transmission according to the second SRS configuration, and abstaining from maintaining phase continuity across the first SRS transmission and the second SRS transmission.

In some examples, determining whether the first SRS configuration and the second SRS configuration specify the same information may include determining that the first SRS configuration and the second SRS configuration do not specify the same information, and transmitting the first SRS transmission and the second SRS transmission may include transmitting the first SRS transmission and transmitting the second SRS transmission, maintaining phase continuity across the first SRS transmission and the second SRS transmission.

In one configuration, the user equipment 800 includes means for receiving a first resource allocation for a first sounding reference signal (SRS) transmission scheduled for a first SRS occasion and a first SRS configuration for the first SRS transmission, means for receiving a second resource allocation for a second SRS transmission scheduled for a second SRS occasion and a second SRS configuration for the second SRS transmission, means for receiving an indication to maintain phase continuity across the first SRS transmission and the second SRS transmission, and means for transmitting the first SRS transmission during the first SRS occasion and the second SRS transmission during the second SRS occasion after verifying whether use of the first SRS configuration and the second SRS configuration will maintain the phase continuity across the first SRS transmission and the second SRS transmission. In one aspect, the aforementioned means may be the processor 804 shown in FIG. 8 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable medium 806, or any other suitable apparatus or means described in any one or more of FIGS. 1, 2, 7, and 8, and utilizing, for example, the methods and/or algorithms described herein in relation to FIGS. 9-11.

Figure 12:
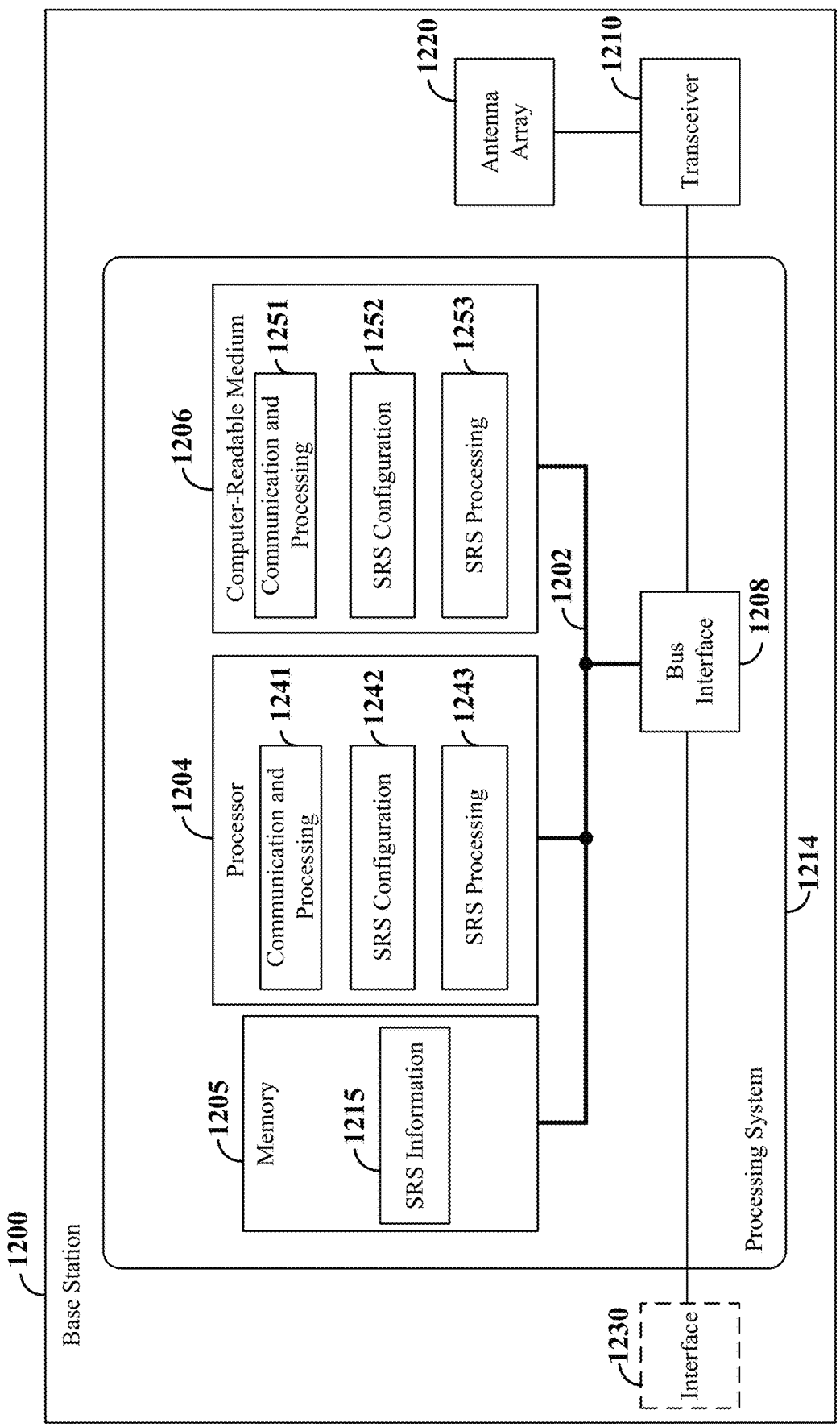
FIG. 12 is a block diagram illustrating an example of a hardware implementation for a base station employing a processing system according to some aspects.

FIG. 12 is a conceptual diagram illustrating an example of a hardware implementation for base station (BS) 1200 employing a processing system 1214. In some implementations, the BS 1200 may correspond to any of the BSs (e.g., gNBs,) or scheduling entities shown in any of FIGS. 1, 2, and 7.

In accordance with various aspects of the disclosure, an element, or any portion of an element, or any combination of elements may be implemented with the processing system 1214. The processing system may include one or more processors 1204. The processing system 1214 may be substantially the same as the processing system 814 illustrated in FIG. 8, including a bus interface 1208, a bus 1202, memory 1205, a processor 1204, and a computer-readable medium 1206. In addition, the memory 1205 may include SRS information 1215 that may be used by the processor 1204 for SRS operations as discussed herein. Furthermore, the BS 1200 may include an interface 1230 (e.g., a network interface) that provides a means for communicating with at least one other apparatus within a core network and with at least one radio access network.

The BS 1200 may be configured to perform any one or more of the operations described herein (e.g., as described above in conjunction with FIGS. 1-7 and as described below in conjunction with FIGS. 13-15). In some aspects of the disclosure, the processor 1204, as utilized in the BS 1200, may include circuitry configured for various functions.

The processor 1204 may be configured to generate, schedule, and modify a resource assignment or grant of time-frequency resources (e.g., a set of one or more resource elements). For example, the processor 1204 may schedule time-frequency resources within a plurality of time division duplex (TDD) and/or frequency division duplex (FDD) subframes, slots, and/or mini-slots to carry user data traffic and/or control information to and/or from multiple UEs.

The processor 1204 may be configured to schedule resources for the transmission of downlink reference signals (e.g., SSBs or CSI-RSs) on a plurality of downlink beams for a downlink beam sweep in accordance with a selected downlink beam sweep type and selected number of downlink reference signal resources. The processor 1204 may further be configured to schedule resources for the uplink transmission of uplink reference signals (e.g., SRSs) on a plurality of uplink beams for an uplink beam sweep in accordance with a selected beam sweep type and selected number of uplink reference signal resources.

The processor 1204 may further be configured to schedule resources for the transmission of an uplink signal. In some examples, the resources may be associated with one or more uplink transmit beams and one or more corresponding receive beams applied to the uplink signal (e.g., based on the uplink BPLs). In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

In some aspects of the disclosure, the processor 1204 may include communication and processing circuitry 1241. The communication and processing circuitry 1244 may be configured to communicate with a UE. The communication and processing circuitry 1241 may include one or more hardware components that provide the physical structure that performs various processes related to communication (e.g., signal reception and/or signal transmission) as described herein. The communication and processing circuitry 1241 may further include one or more hardware components that provide the physical structure that performs various processes related to signal processing (e.g., processing a received signal and/or processing a signal for transmission) as described herein. The communication and processing circuitry 1241 may further be configured to execute communication and processing software 1251 included on the computer-readable medium 1206 to implement one or more functions described herein.

In some examples, the communication and processing circuitry 1241 may be configured to receive and process uplink beamformed signals at a mmWave frequency or a sub-6 GHz frequency via the transceiver 1210 and an antenna array 1220. For example, the communication and processing circuitry 1241 may be configured to receive a respective reference signal (e.g., SRS or DMRS) on each of a plurality of uplink beams from the UE during an uplink beam sweep.

In some examples, the communication and processing circuitry 1241 may further be configured to generate and transmit downlink beamformed signals at a mmWave frequency or a sub-6 GHz frequency via the transceiver 1210 and the antenna array 1220. For example, the communication and processing circuitry 1241 may be configured to transmit a respective downlink reference signal (e.g., SSB or CSI-RS) on each of a plurality of downlink beams to the UE during a downlink beam sweep via at least one first antenna panel of the antenna array 1220. The communication and processing circuitry 1241 may further be configured to receive a beam measurement report from the UE.

The communication and processing circuitry 1241 may further be configured to receive a message from the UE. For example, the message may be included in a MAC-CE carried in a PUSCH, UCI in a PUCCH or PUSCH, a random access message, or an RRC message. The communication and processing circuitry 1241 may further be configured to receive a scheduling request (e.g., via UCI in a PUCCH) from the UE for an uplink grant for the PUSCH.

The communication and processing circuitry 1241 may further be configured to receive an uplink signal on one or more uplink receive beams via one or more uplink transmit beams applied to the uplink signal. For example, the communication and processing circuitry 1241 may be configured to receive the uplink signal on one or more uplink receive beams via at least one second antenna panel of the antenna array 1220. The uplink signal may include, for example, a PUCCH, PUSCH, SRS, DMRS, or PRACH.

The communication and processing circuitry 1241 may further be configured to control the antenna array 1220 and transceiver 1210 to generate a plurality of downlink transmit beams during a downlink beam sweep. The communication and processing circuitry 1241 may further be configured to receive a beam measurement report from the UE using the communication and processing circuitry 1244. The communication and processing circuitry 1241 may further be configured to identify one or more selected uplink beam(s) based on the beam measurements. In some examples, the communication and processing circuitry 1241 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

The communication and processing circuitry 1241 may be configured to receive one or more uplink transmit beams in an uplink beam sweep. Each uplink transmit beam may carry an uplink reference signal (e.g., an SRS) for measurement by the communication and processing circuitry 1241. The communication and processing circuitry 1241 may further be configured to obtain a plurality of beam measurements on each of a plurality of uplink receive beams of the antenna array 1220 for each of the uplink transmit beams. The communication and processing circuitry 1241 may further be configured to select the selected uplink transmit beam(s) and corresponding uplink receive beams forming respective uplink BPLs based on the uplink beam measurements.

In some implementations wherein the communication involves receiving information, the communication and processing circuitry 1241 may obtain information from a component of the BS 1200 (e.g., from the transceiver 1210 that receives the information via radio frequency signaling or some other type of signaling suitable for the applicable communication medium), process (e.g., decode) the information, and output the processed information. For example, the communication and processing circuitry 1241 may output the information to another component of the processor 1204, to the memory 1205, or to the bus interface 1208. In some examples, the communication and processing circuitry 1241 may receive one or more of signals, messages, other information, or any combination thereof. In some examples, the communication and processing circuitry 1241 may receive information via one or more channels. In some examples, the communication and processing circuitry 1241 may include functionality for a means for receiving. In some examples, the communication and processing circuitry 1241 may include functionality for a means for decoding.

In some implementations wherein the communication involves sending (e.g., transmitting) information, the communication and processing circuitry 1241 may obtain information (e.g., from another component of the processor 1204, the memory 1205, or the bus interface 1208), process (e.g., encode) the information, and output the processed information. For example, the communication and processing circuitry 1241 may output the information to the transceiver 1210 (e.g., that transmits the information via radio frequency signaling or some other type of signaling suitable for the applicable communication medium). In some examples, the communication and processing circuitry 1241 may send one or more of signals, messages, other information, or any combination thereof. In some examples, the communication and processing circuitry 1241 may send information via one or more channels. In some examples, the communication and processing circuitry 1241 may include functionality for a means for sending (e.g., a means for transmitting). In some examples, the communication and processing circuitry 1241 may include functionality for a means for encoding.

The processor 1204 may include SRS configuration circuitry 1242 configured to perform SRS configuration-related operations as discussed herein (e.g., one or more of the operations described in conjunction with FIGS. 6 and 7). The SRS configuration circuitry 1242 may be configured to execute SRS configuration software 1252 included on the computer-readable medium 1206 to implement one or more functions described herein.

Figure 13:
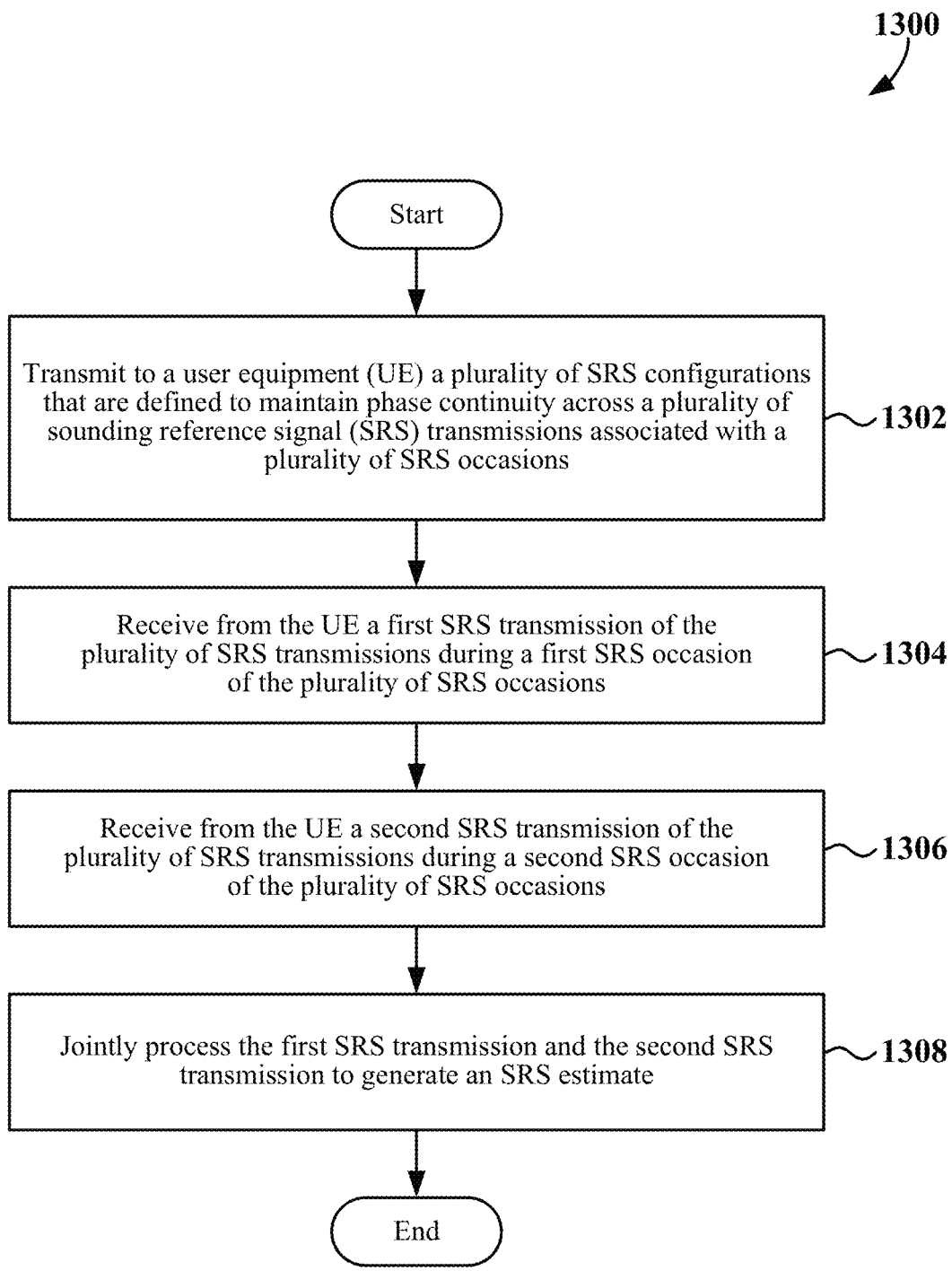
FIG. 13 is a flow chart of a first example method for jointly processing SRS transmissions according to some aspects.
Figure 14:
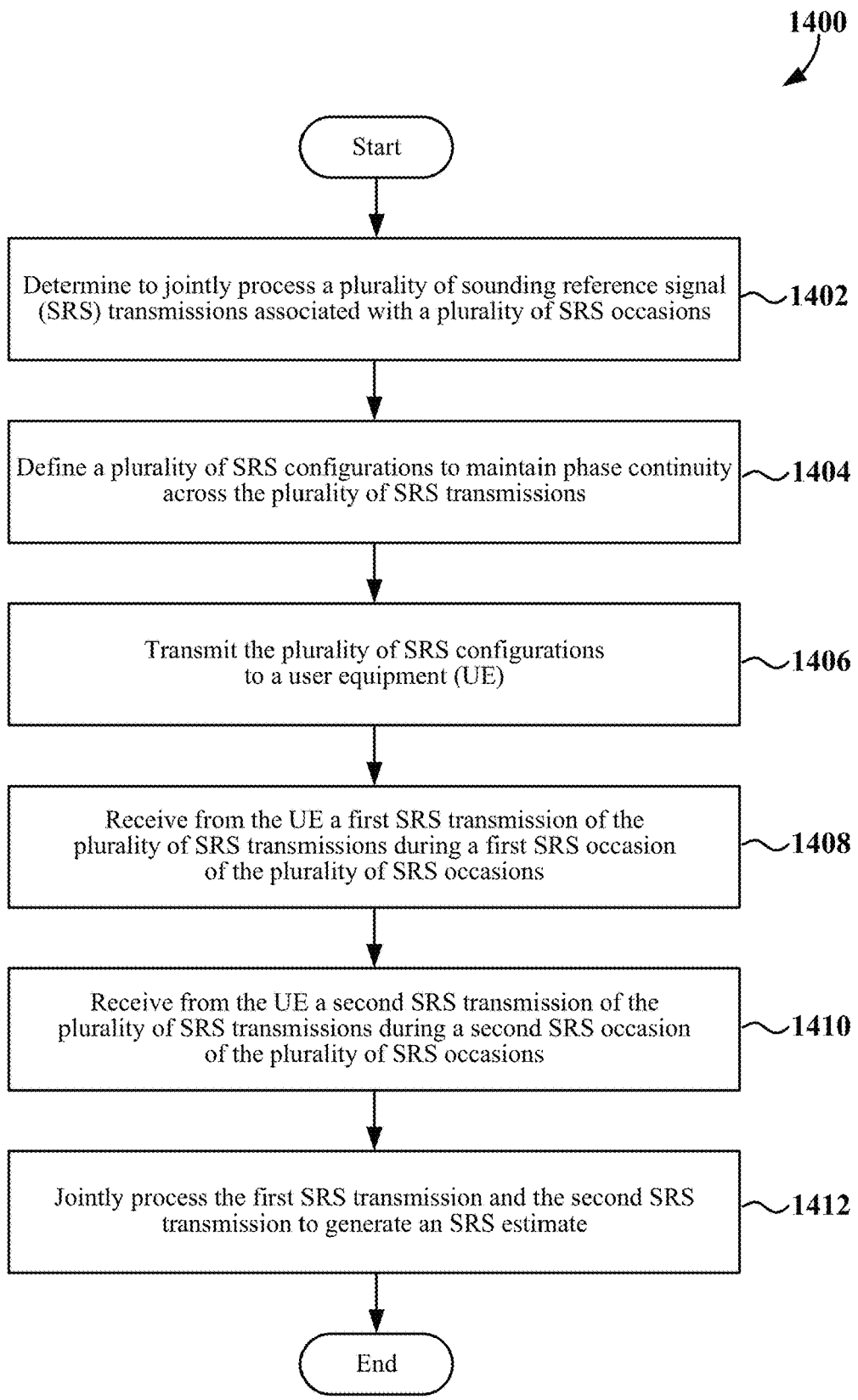
FIG. 14 is a flow chart of a second example method for jointly processing SRS transmissions according to some aspects.
Figure 15:
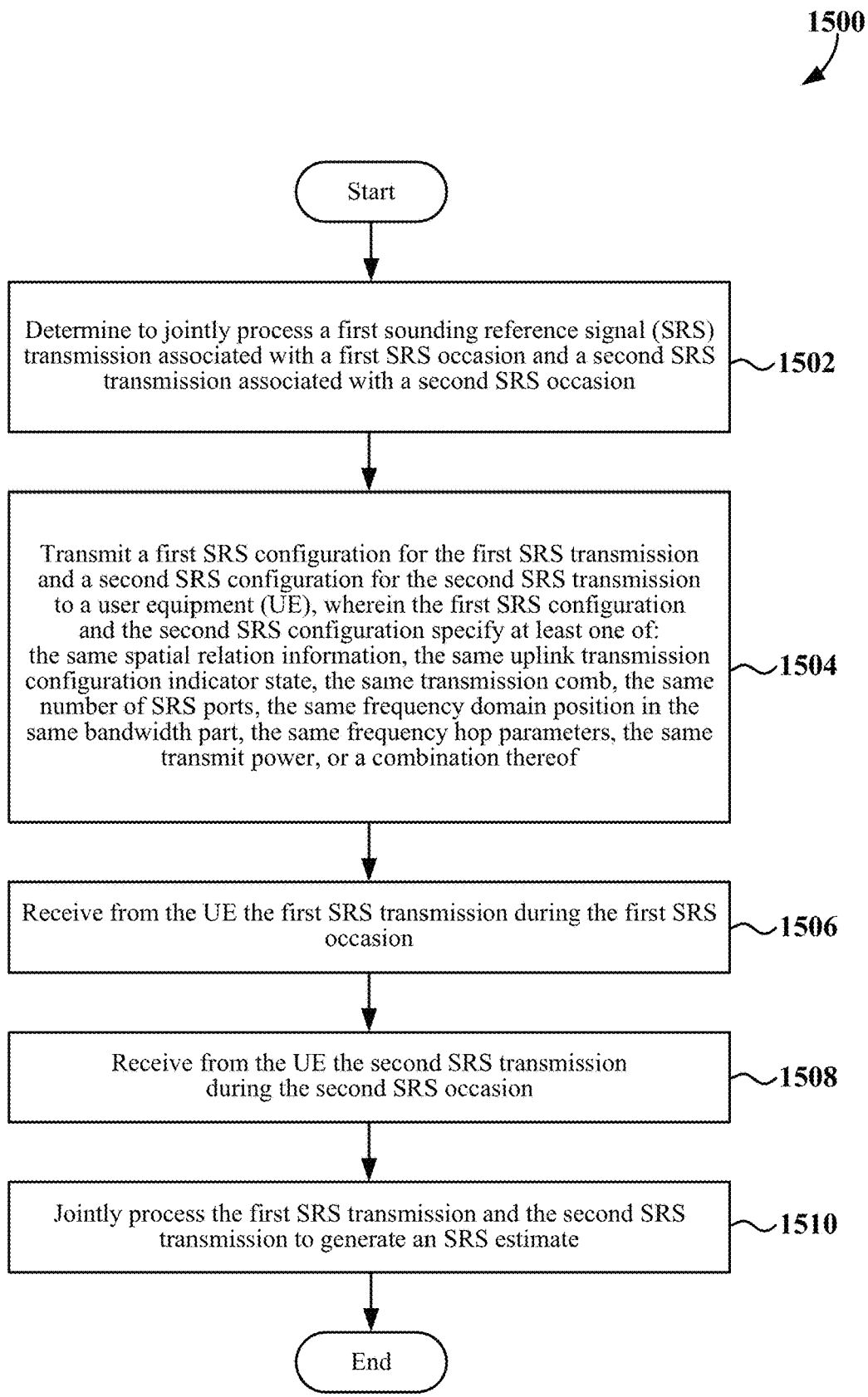
FIG. 15 is a flow chart of a third example method for jointly processing SRS transmissions according to some aspects.

The SRS configuration circuitry 1242 may include functionality for a means for defining an SRS configuration (e.g., as described at 708, 710, and/or 710 of FIG. 7 and/or block 1302 of FIG. 13 and/or block 1404 of FIG. 14 and/or block 1504 of FIG. 15). For example, the SRS configuration circuitry 1242 may specify the same parameters for different SRS configurations (e.g., for different SRS transmissions).

The SRS configuration circuitry 1242 may include functionality for a means for transmitting an SRS configuration (e.g., as described at 708, 710, and/or 710 of FIG. 7 and/or block 1302 of FIG. 13 and/or block 1406 of FIG. 14 and/or block 1504 of FIG. 15). For example, the SRS configuration circuitry 1242 together with the communication and processing circuitry 1241 and the transceiver 1210 may transmit the SRS configurations on a PDCCH.

The processor 1204 may include SRS processing circuitry 1243 configured to perform SRS processing-related operations as discussed herein (e.g., one or more of the operations described in conjunction with FIGS. 6 and 7). The SRS processing circuitry 1243 may be configured to execute SRS processing software 1253 included on the computer-readable medium 1206 to implement one or more functions described herein.

The SRS processing circuitry 1243 may include functionality for a means for determining to jointly process SRS transmissions (e.g., as described at 726 of FIG. 7 and/or block 1302 of FIG. 13 and/or block 1402 of FIG. 14 and/or block 1502 of FIG. 15). For example, the SRS configuration circuitry 1242 may determine that a more reliable SRS estimate is needed.

The SRS processing circuitry 1243 may include functionality for a means for receiving SRS transmissions (e.g., as described at 720, 722, and/or 724 of FIG. 7 and/or block 1304 and/or 1306 of FIG. 13 and/or block 1408 and/or 1410 of FIG. 14 and/or block 1506 and/or 1508 of FIG. 15). For example, the SRS processing circuitry 1243 together with the communication and processing circuitry 1241 and the transceiver 1210 may receive the SRS transmission on scheduled uplink resources.

The SRS processing circuitry 1243 may include functionality for a means for jointly processing SRS transmissions (e.g., as described at 726 of FIG. 7 and/or block 1308 of FIG. 13 and/or block 1412 of FIG. 14 and/or block 1510 of FIG. 15). For example, the SRS processing circuitry 1243 may combine the SRS transmissions to estimate the SRS transmitted by a UE.

In some examples, the SRS processing circuitry 1243 may monitor SRS resources allocated for SRS occasions. The SRS processing circuitry 1243 may the decode the energy received on those resources to recover the SRS. The SRS processing circuitry 1243 may include functionality for a means for generating a channel estimate based on a SRS. For example, the SRS processing circuitry 1243 may compare the received SRS with the known original SRS transmitted by the UE. The SRS processing circuitry 1243 may then generate a channel estimate based on any differences between the received SRS and the known original SRS.

FIG. 13 is a flow chart illustrating an example method 1300 for wireless communication in accordance with some aspects of the present disclosure. As described below, some or all illustrated features may be omitted in a particular implementation within the scope of the present disclosure, and some illustrated features may not be required for implementation of all examples. In some examples, the method 1300 may be carried out by the BS 1200 illustrated in FIG. 12. In some examples, the method 1300 may be carried out by any suitable apparatus or means for carrying out the functions or algorithm described below.

At block 1302, the BS may transmit to a user equipment (UE) a plurality of SRS configurations that are defined to maintain phase continuity across a plurality of sounding reference signal (SRS) transmissions associated with a plurality of SRS occasions. For example, the SRS configuration circuitry 1242 together with the communication and processing circuitry 1241 and the transceiver 1210, shown and described above in connection with FIG. 12, may provide a means to transmit to a user equipment (UE) a plurality of SRS configurations that are defined to maintain phase continuity across a plurality of sounding reference signal (SRS) transmissions associated with a plurality of SRS occasions.

In some examples, the BS may determine to jointly process the plurality of SRS transmissions. In some examples, determining to jointly process the plurality of SRS transmissions may include at least one of determining that the user equipment is near a cell edge of a serving cell for the user equipment, determining that a quality of a channel between the user equipment and the base station is less than a threshold quality, determining that a signal-to-noise ratio associated with the user equipment is less than a threshold signal-to-noise ratio, or a combination thereof.

In some examples, the BS may define the plurality of SRS configurations to maintain phase continuity across the plurality of SRS transmissions. In some examples, defining the plurality of SRS configurations to maintain phase continuity across the plurality of SRS transmissions may include specifying the same parameter values for the plurality of SRS configurations. In some examples, defining the plurality of SRS configurations to maintain phase continuity across the plurality of SRS transmissions may include defining the plurality of SRS configurations to maintain substantially the same phase continuity (e.g., power amplifier phase) across the plurality of SRS transmissions.

In some examples, each of the plurality of SRS configurations specify at least one of the same spatial relation information, the same uplink transmission configuration indicator state, the same transmission comb, the same number of SRS ports, the same frequency domain position in the same bandwidth part, the same frequency hop parameters, the same transmit power, or a combination thereof.

In some examples, the plurality of SRS configurations may include a first SRS configuration for the first SRS transmission and a second SRS configuration for the second SRS transmission. In some examples, the first SRS configuration specifies a first uplink transmission configuration indicator state, and the second SRS configuration specifies the first uplink transmission configuration indicator state. In some examples, the first SRS configuration specifies a first number of ports, and the second SRS configuration specifies the first number of ports. In some examples, the first SRS configuration specifies a first transmission comb value, and the second SRS configuration specifies the first transmission comb value. In some examples, the first SRS configuration specifies a first frequency domain position, and the second SRS configuration specifies the first frequency domain position. In some examples, the first SRS configuration specifies a first frequency hopping configuration value, and the second SRS configuration specifies the first frequency hopping configuration value. In some examples, the first SRS configuration specifies a first SRS bandwidth and a first SRS hopping bandwidth, and the second SRS configuration specifies the first SRS bandwidth and the first SRS hopping bandwidth. In some examples, the first SRS configuration specifies a first transmit power configuration, and the second SRS configuration specifies the first transmit power configuration.

In some examples, the first SRS configuration specifies a first set of spatial relation information, and the second SRS configuration specifies a second set of spatial relation information. In some examples, the first set of spatial relation information and the second set of spatial relation information specify at least one of the same serving cell identifier, the same synchronization signal block index, the same channel state information reference signal index, the same SRS resource identifier, the same uplink bandwidth part, or a combination thereof.

At block 1304, the BS may receive from the UE a first SRS transmission of the plurality of SRS transmissions during a first SRS occasion of the plurality of SRS occasions. For example, the SRS processing circuitry 1243 together with the communication and processing circuitry 1241 and the transceiver 1210, shown and described above in connection with FIG. 12, may provide a means to receive from the UE a first SRS transmission of the plurality of SRS transmissions during a first SRS occasion of the plurality of SRS occasions.

At block 1306, the BS may receive from the UE a second SRS transmission of the plurality of SRS transmissions during a second SRS occasion of the plurality of SRS occasions. For example, the SRS processing circuitry 1243 together with the communication and processing circuitry 1241 and the transceiver 1210 may provide a means to receive from the UE a second SRS transmission of the plurality of SRS transmissions during a second SRS occasion of the plurality of SRS occasions.

At block 1308, the BS may jointly process the first SRS transmission and the second SRS transmission to generate an SRS estimate. For example, the SRS processing circuitry 1243 may provide a means to jointly process the first SRS transmission and the second SRS transmission to generate an SRS estimate.

In some examples, jointly processing the first SRS transmission and the second SRS transmission may include combining the first SRS transmission and the second SRS transmission to provide a combined SRS transmission, and processing the combined SRS transmission to generate the SRS estimate. In some examples, the combining may include weighted combining where a first weight is associated with the first SRS transmission and a second weight is associated with the second SRS transmission.

In some examples, jointly processing the first SRS transmission and the second SRS transmission may include processing the first SRS transmission to provide a first SRS estimate, processing the second SRS transmission to provide a second SRS estimate, and combining the first SRS estimate and the second SRS estimate to generate the SRS estimate. In some examples, the combining may include weighted combining where a first weight is associated with the first SRS estimate and a second weight is associated with the second SRS estimate.

In some examples, the BS may receive capability information from the user equipment, wherein the capability information indicates that the user equipment supports maintaining phase continuity across SRS transmissions for different SRS occasions. In some examples, the BS may transmit an indication to the user equipment after receiving the capability information, wherein the indication configures the user equipment to maintain phase continuity across the first SRS transmission and the second SRS transmission.

In some examples, transmitting the plurality of SRS configurations to the user equipment may include transmitting at least one downlink control information (DCI) to the user equipment, the at least one DCI specifies a first resource for the first SRS occasion and a second resource for the second SRS occasion, and the at least one DCI specifies that the user equipment is to use the first SRS configuration for the first SRS transmission during the first SRS occasion and that the user equipment is to use the second SRS configuration for the second SRS transmission during the second SRS occasion.

FIG. 14 is a flow chart illustrating an example method 1400 for wireless communication in accordance with some aspects of the present disclosure. As described below, some or all illustrated features may be omitted in a particular implementation within the scope of the present disclosure, and some illustrated features may not be required for implementation of all examples. In some examples, the method 1400 may be carried out by the BS 1200 illustrated in FIG. 12. In some examples, the method 1400 may be carried out by any suitable apparatus or means for carrying out the functions or algorithm described below.

At block 1402, a BS may determine to jointly process a plurality of sounding reference signal (SRS) transmissions associated with a plurality of SRS occasions. For example, the SRS configuration circuitry 1242, shown and described above in connection with FIG. 12, may provide a means to determine to jointly process a plurality of sounding reference signal (SRS) transmissions associated with a plurality of SRS occasions.

In some examples, determining to jointly process the plurality of SRS transmissions may include at least one of determining that the user equipment is near a cell edge of a serving cell for the user equipment, determining that a quality of a channel between the user equipment and the base station is less than a threshold quality, determining that a signal-to-noise ratio associated with the user equipment is less than a threshold signal-to-noise ratio, or a combination thereof.

At block 1404, the BS may define a plurality of SRS configurations to maintain phase continuity across the plurality of SRS transmissions (e.g., after determining to jointly process the plurality of SRS transmissions at block 1402). For example, the SRS configuration circuitry 1242 may provide a means to define a plurality of SRS configurations to maintain phase continuity across the plurality of SRS transmissions.

In some examples, defining the plurality of SRS configurations to maintain phase continuity across the plurality of SRS transmissions may include specifying the same parameter values for the plurality of SRS configurations. In some examples, defining the plurality of SRS configurations to maintain phase continuity across the plurality of SRS transmissions may include defining the plurality of SRS configurations to maintain substantially the same phase continuity (e.g., power amplifier phase) across the plurality of SRS transmissions.

In some examples, each of the plurality of SRS configurations specify at least one of the same spatial relation information, the same uplink transmission configuration indicator state, the same transmission comb, the same number of SRS ports, the same frequency domain position in the same bandwidth part, the same frequency hop parameters, the same transmit power, or a combination thereof.

In some examples, the plurality of SRS configurations may include a first SRS configuration for the first SRS transmission and a second SRS configuration for the second SRS transmission. In some examples, the first SRS configuration specifies a first uplink transmission configuration indicator state, and the second SRS configuration specifies the first uplink transmission configuration indicator state. In some examples, the first SRS configuration specifies a first number of ports, and the second SRS configuration specifies the first number of ports. In some examples, the first SRS configuration specifies a first transmission comb value, and the second SRS configuration specifies the first transmission comb value. In some examples, the first SRS configuration specifies a first frequency domain position, and the second SRS configuration specifies the first frequency domain position. In some examples, the first SRS configuration specifies a first frequency hopping configuration value, and the second SRS configuration specifies the first frequency hopping configuration value. In some examples, the first SRS configuration specifies a first SRS bandwidth and a first SRS hopping bandwidth, and the second SRS configuration specifies the first SRS bandwidth and the first SRS hopping bandwidth. In some examples, the first SRS configuration specifies a first transmit power configuration, and the second SRS configuration specifies the first transmit power configuration.

In some examples, the first SRS configuration specifies a first set of spatial relation information, the second SRS configuration specifies a second set of spatial relation information, and the first set of spatial relation information and the second set of spatial relation information specify at least one of the same serving cell identifier, the same synchronization signal block index, the same channel state information reference signal index, the same SRS resource identifier, the same uplink bandwidth part, or a combination thereof.

At block 1406, the BS may transmit the plurality of SRS configurations to a user equipment (UE). For example, the SRS configuration circuitry 1242 together with the communication and processing circuitry 1241 and the transceiver 1210, shown and described above in connection with FIG. 12, may provide a means to transmit the plurality of SRS configurations to a user equipment (UE).

At block 1408, the BS may receive from the UE a first SRS transmission of the plurality of SRS transmissions during a first SRS occasion of the plurality of SRS occasions. For example, the SRS processing circuitry 1243 together with the communication and processing circuitry 1241 and the transceiver 1210, shown and described above in connection with FIG. 12, may provide a means to receive from the UE a first SRS transmission of the plurality of SRS transmissions during a first SRS occasion of the plurality of SRS occasions.

At block 1410, the BS may receive from the UE a second SRS transmission of the plurality of SRS transmissions during a second SRS occasion of the plurality of SRS occasions. For example, the SRS processing circuitry 1243 together with the communication and processing circuitry 1241 and the transceiver 1210 may provide a means to receive from the UE a second SRS transmission of the plurality of SRS transmissions during a second SRS occasion of the plurality of SRS occasions.

At block 1412, the BS may jointly process the first SRS transmission and the second SRS transmission to generate an SRS estimate. For example, the SRS processing circuitry 1243 may provide a means to jointly process the first SRS transmission and the second SRS transmission to generate an SRS estimate.

In some examples, jointly processing the first SRS transmission and the second SRS transmission may include combining the first SRS transmission and the second SRS transmission to provide a combined SRS transmission, and processing the combined SRS transmission to generate the SRS estimate. In some examples, the combining may include weighted combining where a first weight is associated with the first SRS transmission and a second weight is associated with the second SRS transmission.

In some examples, jointly processing the first SRS transmission and the second SRS transmission may include processing the first SRS transmission to provide a first SRS estimate, processing the second SRS transmission to provide a second SRS estimate, and combining the first SRS estimate and the second SRS estimate to generate the SRS estimate. In some examples, the combining may include weighted combining where a first weight is associated with the first SRS estimate and a second weight is associated with the second SRS estimate.

In some examples, the BS may receive capability information from the user equipment, wherein the capability information indicates that the user equipment supports maintaining phase continuity across SRS transmissions for different SRS occasions. In some examples, the BS may transmit an indication to the user equipment after receiving the capability information, wherein the indication configures the user equipment to maintain phase continuity across the first SRS transmission and the second SRS transmission.

In some examples, to transmit the plurality of SRS configurations to the user equipment, the BS may transmit at least one downlink control information (DCI) to the user equipment, wherein the at least one DCI specifies a first resource for the first SRS occasion and a second resource for the second SRS occasion, and the at least one DCI specifies that the user equipment is to use the first SRS configuration for the first SRS transmission during the first SRS occasion and that the user equipment is to use the second SRS configuration for the second SRS transmission during the second SRS occasion.

FIG. 15 is a flow chart illustrating an example method 1500 for wireless communication in accordance with some aspects of the present disclosure. As described below, some or all illustrated features may be omitted in a particular implementation within the scope of the present disclosure, and some illustrated features may not be required for implementation of all examples. In some examples, the method 1500 may be carried out by the BS 1200 illustrated in FIG. 12. In some examples, the method 1500 may be carried out by any suitable apparatus or means for carrying out the functions or algorithm described below.

At block 1502, a BS may determine to jointly process a first sounding reference signal (SRS) transmission associated with a first SRS occasion and a second SRS transmission associated with a second SRS occasion. For example, the SRS configuration circuitry 1242, shown and described above in connection with FIG. 12, may provide a means to determine to jointly process a first sounding reference signal (SRS) transmission associated with a first SRS occasion and a second SRS transmission associated with a second SRS occasion.

In some examples, determining to jointly process the first SRS transmission and the second SRS transmission may include at least one of determining that the user equipment is near a cell edge of a serving cell for the user equipment, determining that a quality of a channel between the user equipment and the base station is less than a threshold quality, determining that a signal-to-noise ratio associated with the user equipment is less than a threshold signal-to-noise ratio, or a combination thereof.

In some examples, the first SRS occasion corresponds to at least one first time slot, and the second SRS occasion corresponds to at least one second time slot that is different from the at least one first time slot.

At block 1504, the BS may transmit a first SRS configuration for the first SRS transmission and a second SRS configuration for the second SRS transmission to a user equipment (UE) (e.g., after determining to jointly process the first SRS transmission and the second SRS transmission). In some examples, the first SRS configuration and the second SRS configuration specify at least one of: the same spatial relation information, the same uplink transmission configuration indicator state, the same transmission comb, the same number of SRS ports, the same frequency domain position in the same bandwidth part, the same frequency hop parameters, the same transmit power, or a combination thereof. For example, the SRS configuration circuitry 1242 together with the communication and processing circuitry 1241 and the transceiver 1210, shown and described above in connection with FIG. 12, may provide a means to transmit a first SRS configuration for the first SRS transmission and a second SRS configuration for the second SRS transmission to a user equipment (UE).

At block 1506, the BS may receive from the UE the first SRS transmission during the first SRS occasion. For example, the SRS processing circuitry 1243 together with the communication and processing circuitry 1241 and the transceiver 1210, shown and described above in connection with FIG. 12, may provide a means to receive from the UE the first SRS transmission during the first SRS occasion.

At block 1508, the BS may receive from the UE the second SRS transmission during the second SRS occasion. For example, the SRS processing circuitry 1243 together with the communication and processing circuitry 1241 and the transceiver 1210 may provide a means to receive from the UE the second SRS transmission during the second SRS occasion.

At block 1510, the BS may jointly process the first SRS transmission and the second SRS transmission to generate an SRS estimate. For example, the SRS processing circuitry 1243 may provide a means to jointly process the first SRS transmission and the second SRS transmission to generate an SRS estimate.

In some examples, jointly processing the first SRS transmission and the second SRS transmission may include combining the first SRS transmission and the second SRS transmission to provide a combined SRS transmission, and processing the combined transmission to generate the SRS estimate.

In some examples, jointly processing the first SRS transmission and the second SRS transmission may include processing the first SRS transmission to provide a first SRS estimate, processing the second SRS transmission to provide a second SRS estimate, and combining the first SRS estimate and the second SRS estimate to generate the SRS estimate.

In some examples, the BS may define the first SRS configuration and the second SRS configuration to maintain phase continuity across the first SRS transmission and the second SRS transmission. In some examples, defining the first SRS configuration and the second SRS configuration to maintain phase continuity across the first SRS transmission and the second SRS transmission may include specifying the same parameter values for the first SRS configuration and the second SRS configuration.

In some examples, defining the first SRS configuration and the second SRS configuration to maintain phase continuity across the first SRS transmission and the second SRS transmission may include defining the first SRS configuration and the second SRS configuration to maintain substantially the same phase continuity (e.g., power amplifier phase) for the first SRS transmission and the second SRS transmission.

In some examples, the BS may receive capability information from the user equipment, wherein the capability information indicates that the user equipment supports bundling across SRS transmissions for different SRS occasions. In some examples, the BS may transmit an indication to the user equipment after receiving the capability information, wherein the indication configures the user equipment to maintain phase continuity across the first SRS transmission and the second SRS transmission.

In some examples, transmitting the plurality of SRS configurations to the user equipment may include transmitting a first downlink control information (DCI) and a second DCI to the user equipment, the first DCI specifies a first resource for the first SRS occasion and further specifies that the user equipment is to use the first SRS configuration for the first SRS transmission during the first SRS occasion, and the second DCI specifies a second resource for the second SRS occasion and further specifies that the user equipment is to use the second SRS configuration for the second SRS transmission during the second SRS occasion.

In one configuration, the base station 1200 includes means for transmitting to a user equipment a plurality of SRS configurations that are defined to maintain phase continuity across a plurality of sounding reference signal (SRS) transmissions associated with a plurality of SRS occasions, means for receiving from the user equipment a first SRS transmission of the plurality of SRS transmissions during a first SRS occasion of the plurality of SRS occasions, means for receiving from the user equipment a second SRS transmission of the plurality of SRS transmissions during a second SRS occasion of the plurality of SRS occasions, and means for jointly processing the first SRS transmission and the second SRS transmission to generate an SRS estimate. In one aspect, the aforementioned means may be the processor 1204 shown in FIG. 12 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable medium 1206, or any other suitable apparatus or means described in any one or more of FIGS. 1, 2, 7, and 12, and utilizing, for example, the methods and/or algorithms described herein in relation to FIGS. 13-15.

In some examples, a method of wireless communication at a user equipment may include receiving a first resource allocation for a first sounding reference signal (SRS) transmission scheduled for a first SRS occasion and a first SRS configuration for the first SRS transmission, receiving a second resource allocation for a second SRS transmission scheduled for a second SRS occasion and a second SRS configuration for the second SRS transmission, receiving an indication to maintain phase continuity across the first SRS transmission and the second SRS transmission, after receiving the indication, verifying whether use of the first SRS configuration and the second SRS configuration will maintain phase continuity across the first SRS transmission and the second SRS transmission, and transmitting the first SRS transmission during the first SRS occasion and the second SRS transmission during the second SRS occasion after verifying whether use of the first SRS configuration and the second SRS configuration will maintain phase continuity across the first SRS transmission and the second SRS transmission.

In some examples, a user equipment may include a transceiver, a memory, and a processor communicatively coupled to the transceiver and the memory. The processor may be configured to receive via the transceiver a first resource allocation for a first sounding reference signal (SRS) transmission scheduled for a first SRS occasion and a first SRS configuration for the first SRS transmission, receive via the transceiver a second resource allocation for a second SRS transmission scheduled for a second SRS occasion and a second SRS configuration for the second SRS transmission, receive an indication to maintain phase continuity across the first SRS transmission and the second SRS transmission via the transceiver, after receiving the indication, verify whether use of the first SRS configuration and the second SRS configuration will maintain phase continuity across the first SRS transmission and the second SRS transmission, and transmit the first SRS transmission via the transceiver during the first SRS occasion and the second SRS transmission during the second SRS occasion after verifying whether use of the first SRS configuration and the second SRS configuration will maintain phase continuity across the first SRS transmission and the second SRS transmission.

In some examples, a user equipment may include means for receiving a first resource allocation for a first sounding reference signal (SRS) transmission scheduled for a first SRS occasion and a first SRS configuration for the first SRS transmission, means for receiving a second resource allocation for a second SRS transmission scheduled for a second SRS occasion and a second SRS configuration for the second SRS transmission, means for receiving an indication to maintain phase continuity across the first SRS transmission and the second SRS transmission, means for verifying, after receiving the indication, whether use of the first SRS configuration and the second SRS configuration will maintain phase continuity across the first SRS transmission and the second SRS transmission, and means for transmitting the first SRS transmission during the first SRS occasion and the second SRS transmission during the second SRS occasion after verifying whether use of the first SRS configuration and the second SRS configuration will maintain phase continuity across the first SRS transmission and the second SRS transmission.

In some examples, an article of manufacture for use by a user equipment includes a computer-readable medium having stored therein instructions executable by one or more processors of the user equipment to receive a first resource allocation for a first sounding reference signal (SRS) transmission scheduled for a first SRS occasion and a first SRS configuration for the first SRS transmission, receive a second resource allocation for a second SRS transmission scheduled for a second SRS occasion and a second SRS configuration for the second SRS transmission, receive an indication to maintain phase continuity across the first SRS transmission and the second SRS transmission, after receiving the indication, verify whether use of the first SRS configuration and the second SRS configuration will maintain phase continuity across the first SRS transmission and the second SRS transmission, and transmit the first SRS transmission during the first SRS occasion and the second SRS transmission during the second SRS occasion after verifying whether use of the first SRS configuration and the second SRS configuration will maintain phase continuity across the first SRS transmission and the second SRS transmission.

In some examples, a method of wireless communication at a base station may include determining to jointly process a plurality of sounding reference signal (SRS) transmissions associated with a plurality of SRS occasions, defining a plurality of SRS configurations to maintain phase continuity across the plurality of SRS transmissions, transmitting the plurality of SRS configurations to a user equipment (UE), receiving from the UE a first SRS transmission of the plurality of SRS transmissions during a first SRS occasion of the plurality of SRS occasions, receiving from the UE a second SRS transmission of the plurality of SRS transmissions during a second SRS occasion of the plurality of SRS occasions, and jointly processing the first SRS transmission and the second SRS transmission to generate an SRS estimate.

In some examples, a base station may include a transceiver, a memory, and a processor communicatively coupled to the transceiver and the memory. The processor may be configured to determine to jointly process a plurality of sounding reference signal (SRS) transmissions associated with a plurality of SRS occasions, define a plurality of SRS configurations to maintain phase continuity across the plurality of SRS transmissions, transmit the plurality of SRS configurations to a user equipment (UE) via the transceiver, receive from the UE a first SRS transmission of the plurality of SRS transmissions via the transceiver during a first SRS occasion of the plurality of SRS occasions, receive from the UE a second SRS transmission of the plurality of SRS transmissions via the transceiver during a second SRS occasion of the plurality of SRS occasions, and jointly process the first SRS transmission and the second SRS transmission to generate an SRS estimate.

In some examples, a base station may include means for determining to jointly process a plurality of sounding reference signal (SRS) transmissions associated with a plurality of SRS occasions, means for defining a plurality of SRS configurations to maintain phase continuity across the plurality of SRS transmissions, means for transmitting the plurality of SRS configurations to a user equipment (UE), means for receiving from the UE a first SRS transmission of the plurality of SRS transmissions during a first SRS occasion of the plurality of SRS occasions, means for receiving from the UE a second SRS transmission of the plurality of SRS transmissions during a second SRS occasion of the plurality of SRS occasions, and means for jointly processing the first SRS transmission and the second SRS transmission to generate an SRS estimate.

In some examples, an article of manufacture for use by a base station includes a computer-readable medium having stored therein instructions executable by one or more processors of the base station to determine to jointly process a plurality of sounding reference signal (SRS) transmissions associated with a plurality of SRS occasions, define a plurality of SRS configurations to maintain phase continuity across the plurality of SRS transmissions, transmit the plurality of SRS configurations to a user equipment (UE), receive from the UE a first SRS transmission of the plurality of SRS transmissions during a first SRS occasion of the plurality of SRS occasions, receive from the UE a second SRS transmission of the plurality of SRS transmissions during a second SRS occasion of the plurality of SRS occasions, and jointly process the first SRS transmission and the second SRS transmission to generate an SRS estimate.

In some examples, a method of wireless communication at a user equipment may include receiving a first resource allocation for a first sounding reference signal (SRS) transmission scheduled for a first SRS occasion and a first SRS configuration for the first SRS transmission, receiving a second resource allocation for a second SRS transmission scheduled for a second SRS occasion and a second SRS configuration for the second SRS transmission, receiving an indication to maintain phase continuity across the first SRS transmission and the second SRS transmission, after receiving the indication, determining whether the first SRS configuration and the second SRS configuration specify the same information, and transmitting the first SRS transmission during the first SRS occasion and the second SRS transmission during the second SRS occasion after determining whether the first SRS configuration and the second SRS configuration specify the same information.

In some examples, a user equipment may include a transceiver, a memory, and a processor communicatively coupled to the transceiver and the memory. The processor may be configured to receive via the transceiver a first resource allocation for a first sounding reference signal (SRS) transmission scheduled for a first SRS occasion and a first SRS configuration for the first SRS transmission, receive via the transceiver a second resource allocation for a second SRS transmission scheduled for a second SRS occasion and a second SRS configuration for the second SRS transmission, receive via the transceiver an indication to maintain phase continuity across the first SRS transmission and the second SRS transmission, after receiving the indication, determine whether the first SRS configuration and the second SRS configuration specify the same information, and transmit the first SRS transmission via the transceiver during the first SRS occasion and the second SRS transmission during the second SRS occasion after determining whether the first SRS configuration and the second SRS configuration specify the same information.

In some examples, a user equipment may include means for receiving a first resource allocation for a first sounding reference signal (SRS) transmission scheduled for a first SRS occasion and a first SRS configuration for the first SRS transmission, means for receiving a second resource allocation for a second SRS transmission scheduled for a second SRS occasion and a second SRS configuration for the second SRS transmission, means for receiving an indication to maintain phase continuity across the first SRS transmission and the second SRS transmission, means for determining, after receiving the indication, whether the first SRS configuration and the second SRS configuration specify the same information, and means for transmitting the first SRS transmission during the first SRS occasion and the second SRS transmission during the second SRS occasion after determining whether the first SRS configuration and the second SRS configuration specify the same information.

In some examples, an article of manufacture for use by a user equipment includes a computer-readable medium having stored therein instructions executable by one or more processors of the user equipment to receive a first resource allocation for a first sounding reference signal (SRS) transmission scheduled for a first SRS occasion and a first SRS configuration for the first SRS transmission, receive a second resource allocation for a second SRS transmission scheduled for a second SRS occasion and a second SRS configuration for the second SRS transmission, receive an indication to maintain phase continuity across the first SRS transmission and the second SRS transmission, after receiving the indication, determine whether the first SRS configuration and the second SRS configuration specify the same information, and transmit the first SRS transmission during the first SRS occasion and the second SRS transmission during the second SRS occasion after determining whether the first SRS configuration and the second SRS configuration specify the same information.

In some examples, a method of wireless communication at a base station may include determining to jointly process a first sounding reference signal (SRS) transmission associated with a first SRS occasion and a second SRS transmission associated with a second SRS occasion, transmitting a first SRS configuration for the first SRS transmission and a second SRS configuration for the second SRS transmission to a user equipment (UE), receiving from the UE the first SRS transmission during the first SRS occasion, receiving from the UE the second SRS transmission during the second SRS occasion, and jointly processing the first SRS transmission and the second SRS transmission to generate an SRS estimate. The first SRS configuration and the second SRS configuration specify at least one of: the same spatial relation information, the same uplink transmission configuration indicator state, the same transmission comb, the same number of SRS ports, the same frequency domain position in the same bandwidth part, the same frequency hop parameters, the same transmit power, or a combination thereof.

In some examples, a base station may include a transceiver, a memory, and a processor communicatively coupled to the transceiver and the memory. The processor may be configured to determine to jointly process a first sounding reference signal (SRS) transmission associated with a first SRS occasion and a second SRS transmission associated with a second SRS occasion, transmit a first SRS configuration for the first SRS transmission and a second SRS configuration for the second SRS transmission to a user equipment (UE) via the transceiver, receive from the UE the first SRS transmission via the transceiver during the first SRS occasion, receive from the UE the second SRS transmission via the transceiver during the second SRS occasion, and jointly process the first SRS transmission and the second SRS transmission to generate an SRS estimate. The first SRS configuration and the second SRS configuration specify at least one of: the same spatial relation information, the same uplink transmission configuration indicator state, the same transmission comb, the same number of SRS ports, the same frequency domain position in the same bandwidth part, the same frequency hop parameters, the same transmit power, or a combination thereof.

In some examples, a base station may include means for determining to jointly process a first sounding reference signal (SRS) transmission associated with a first SRS occasion and a second SRS transmission associated with a second SRS occasion, means for transmitting a first SRS configuration for the first SRS transmission and a second SRS configuration for the second SRS transmission to a user equipment (UE), means for receiving from the UE the first SRS transmission during the first SRS occasion, means for receiving from the UE the second SRS transmission during the second SRS occasion, and means for jointly processing the first SRS transmission and the second SRS transmission to generate an SRS estimate. The first SRS configuration and the second SRS configuration specify at least one of: the same spatial relation information, the same uplink transmission configuration indicator state, the same transmission comb, the same number of SRS ports, the same frequency domain position in the same bandwidth part, the same frequency hop parameters, the same transmit power, or a combination thereof.

In some examples, an article of manufacture for use by a base station includes a computer-readable medium having stored therein instructions executable by one or more processors of the base station to determine to jointly process a first sounding reference signal (SRS) transmission associated with a first SRS occasion and a second SRS transmission associated with a second SRS occasion, transmit a first SRS configuration for the first SRS transmission and a second SRS configuration for the second SRS transmission to a user equipment (UE), receive from the UE the first SRS transmission during the first SRS occasion, receive from the UE the second SRS transmission during the second SRS occasion, and jointly process the first SRS transmission and the second SRS transmission to generate an SRS estimate. The first SRS configuration and the second SRS configuration specify at least one of: the same spatial relation information, the same uplink transmission configuration indicator state, the same transmission comb, the same number of SRS ports, the same frequency domain position in the same bandwidth part, the same frequency hop parameters, the same transmit power, or a combination thereof.

The methods shown in FIGS. 12-15 and 17 may include additional aspects, such as any single aspect or any combination of aspects described below and/or in connection with one or more other processes described elsewhere herein. The following provides an overview of several aspects of the present disclosure.

Aspect 1: A method for wireless communication at a base station, the method comprising: transmitting to a user equipment a plurality of SRS configurations that are defined to maintain phase continuity across a plurality of sounding reference signal (SRS) transmissions associated with a plurality of SRS occasions; receiving from the user equipment a first SRS transmission of the plurality of SRS transmissions during a first SRS occasion of the plurality of SRS occasions; receiving from the user equipment a second SRS transmission of the plurality of SRS transmissions during a second SRS occasion of the plurality of SRS occasions; and jointly processing the first SRS transmission and the second SRS transmission to generate an SRS estimate.

Aspect 2: The method of aspect 1, wherein each of the plurality of SRS configurations specify at least one of: the same spatial relation information, the same uplink transmission configuration indicator state, the same transmission comb, the same number of SRS ports, the same frequency domain position in the same bandwidth part, the same frequency hop parameters, the same transmit power, or a combination thereof.

Aspect 3: The method of aspect 1 or 2, wherein the plurality of SRS configurations comprises a first SRS configuration for the first SRS transmission and a second SRS configuration for the second SRS transmission.

Aspect 4: The method of aspect 3, wherein: the first SRS configuration specifies a first set of spatial relation information; the second SRS configuration specifies a second set of spatial relation information; and the first set of spatial relation information and the second set of spatial relation information specify at least one of: the same serving cell identifier, the same synchronization signal block index, the same channel state information reference signal index, the same SRS resource identifier, the same uplink bandwidth part, or a combination thereof.

Aspect 5: The method of any of aspects 3 through 4, wherein: the first SRS configuration specifies a first uplink transmission configuration indicator state; and the second SRS configuration specifies the first uplink transmission configuration indicator state.

Aspect 6: The method of any of aspects 3 through 5, wherein: the first SRS configuration specifies at least one of: a first number of ports, a first transmission comb value, a first frequency domain position, a first frequency hopping configuration value, a first SRS bandwidth and a first SRS hopping bandwidth, a first transmit power configuration, or a combination thereof; and the second SRS configuration specifies at least one of: the first number of ports, the first transmission comb value, the first frequency domain position, the first frequency hopping configuration value, the first SRS bandwidth and the first SRS hopping bandwidth, the first transmit power configuration, or a combination thereof.

Aspect 7: The method of any of aspects 3 through 6, wherein: the method further comprises transmitting at least one downlink control information (DCI) to the user equipment; the at least one DCI specifies a first resource for the first SRS occasion and a second resource for the second SRS occasion; and the at least one DCI specifies that the user equipment is to use the first SRS configuration for the first SRS transmission during the first SRS occasion and that the user equipment is to use the second SRS configuration for the second SRS transmission during the second SRS occasion.

Aspect 8: The method of any of aspects 1 through 7, further comprising: specifying the same parameter values for the plurality of SRS configurations.

Aspect 9: The method of any of aspects 1 through 8, further comprising: defining the plurality of SRS configurations to maintain substantially the same phase continuity across the plurality of SRS transmissions.

Aspect 10: The method of any of aspects 1 through 9, further comprising: receiving capability information from the user equipment, wherein the capability information indicates that the user equipment supports maintaining phase continuity across SRS transmissions for different SRS occasions; and transmitting an indication to the user equipment after receiving the capability information, wherein the indication configures the user equipment to maintain phase continuity across the first SRS transmission and the second SRS transmission.

Aspect 11: The method of any of aspects 1 through 10, further comprising: combining the first SRS transmission and the second SRS transmission to provide a combined SRS transmission, wherein where a first weight is associated with the first SRS transmission and a second weight is associated with the second SRS transmission; and processing the combined SRS transmission to generate the SRS estimate.

Aspect 12: The method of any of aspects 1 through 10, further comprising: processing the first SRS transmission to provide a first SRS estimate; processing the second SRS transmission to provide a second SRS estimate; and combining the first SRS estimate and the second SRS estimate to generate the SRS estimate, wherein where a first weight is associated with the first SRS transmission and a second weight is associated with the second SRS transmission.

Aspect 13: The method of any of aspects 1 through 12, further comprising: determining to jointly process the plurality of SRS transmission based on whether the user equipment is near a cell edge of a serving cell for the user equipment, a quality of a channel between the user equipment and the base station is less than a threshold quality, a signal-to-noise ratio associated with the user equipment is less than a threshold signal-to-noise ratio, or a combination thereof.

Aspect 15: A method for wireless communication at a user equipment, the method comprising: receiving a first resource allocation for a first sounding reference signal (SRS) transmission scheduled for a first SRS occasion and a first SRS configuration for the first SRS transmission; receiving a second resource allocation for a second SRS transmission scheduled for a second SRS occasion and a second SRS configuration for the second SRS transmission; receiving an indication to maintain phase continuity across the first SRS transmission and the second SRS transmission; and transmitting the first SRS transmission during the first SRS occasion and the second SRS transmission during the second SRS occasion after verifying whether use of the first SRS configuration and the second SRS configuration will maintain the phase continuity across the first SRS transmission and the second SRS transmission.

Aspect 16: The method of aspect 15, further comprising: determining that use of the first SRS configuration and the second SRS configuration will maintain the phase continuity across the first SRS transmission and the second SRS transmission.

Aspect 17: The method of aspect 16, further comprising: transmitting the first SRS transmission according to the first SRS configuration and transmitting the second SRS transmission according to the second SRS configuration, maintaining the phase continuity across the first SRS transmission and the second SRS transmission.

Aspect 18: The method of aspect 17, further comprising: maintaining substantially the same phase continuity across the first SRS transmission and the second SRS transmission.

Aspect 19: The method of aspect 15, further comprising: determining that use of the first SRS configuration and the second SRS configuration will not maintain the phase continuity across the first SRS transmission and the second SRS transmission.

Aspect 20: The method of aspect 19, further comprising: transmitting the first SRS transmission according to the first SRS configuration, transmitting the second SRS transmission according to the second SRS configuration, and abstaining from maintaining the phase continuity across the first SRS transmission and the second SRS transmission.

Aspect 21: The method of aspect 19, further comprising: transmitting the first SRS transmission and transmitting the second SRS transmission, maintaining the phase continuity across the first SRS transmission and the second SRS transmission.

Aspect 22: The method of any of aspects 15 through 21, further comprising: determining whether the first SRS configuration and the second SRS configuration specify at least one of: the same spatial relation information, the same uplink transmission configuration indicator state, the same transmission comb, the same number of SRS ports, the same frequency domain position in the same bandwidth part, the same frequency hop parameters, the same transmit power, or a combination thereof.

Aspect 23: The method of any of aspects 15 through 21, wherein: the first SRS configuration specifies a first set of spatial relation information; the second SRS configuration specifies a second set of spatial relation information; and the method further comprises determining whether the first set of spatial relation information and the second set of spatial relation information specify at least one of: the same serving cell identifier, the same synchronization signal block index, the same channel state information reference signal index, the same SRS resource identifier, the same uplink bandwidth part, or a combination thereof.

Aspect 24: The method of any of aspects 15 through 21, wherein, verifying whether the use of the first SRS configuration and the second SRS configuration will maintain the phase continuity across the first SRS transmission and the second SRS transmission comprises determining at least one of: whether the first SRS configuration specifies a first uplink transmission configuration indicator state, whether the first SRS configuration specifies a first number of ports, whether the first SRS configuration specifies a first transmission comb value, whether the first SRS configuration specifies a first frequency domain position, whether the first SRS configuration specifies a first frequency hopping configuration value, whether the first SRS configuration specifies a first SRS bandwidth and a first SRS hopping bandwidth, whether the first SRS configuration specifies a first transmit power configuration, or a combination thereof.

Aspect 25: The method of any of aspects 15 through 21, wherein, verifying whether the use of the first SRS configuration and the second SRS configuration will maintain the phase continuity across the first SRS transmission and the second SRS transmission comprises determining at least one of: whether the second SRS configuration specifies the first uplink transmission configuration indicator state, whether the second SRS configuration specifies the first number of ports, whether the second SRS configuration specifies the first transmission comb value, whether the second SRS configuration specifies the first frequency domain position, whether the second SRS configuration specifies the first frequency hopping configuration value, whether the second SRS configuration specifies the first SRS bandwidth and the first SRS hopping bandwidth, whether the second SRS configuration specifies the first transmit power configuration, or a combination thereof.

Aspect 26: The method of any of aspects 15 through 25, further comprising: transmitting capability information to a base station, wherein the capability information indicates that the user equipment supports maintaining phase continuity across SRS transmissions for different SRS occasions; and receiving the indication after transmitting the capability information.

Aspect 27: The method of any of aspects 15 through 26, wherein: the method further comprises receiving at least one downlink control information (DCI) from a base station; and the at least one DCI specifies that the user equipment is to use the first SRS configuration for the first SRS transmission during the first SRS occasion and that the user equipment is to use the second SRS configuration for the second SRS transmission during the second SRS occasion.

Aspect 28: The method of any of aspects 15 through 27, further comprising: receiving a medium access control—control element (MAC-CE) that includes the indication.

Aspect 29: The method of any of aspects 15 through 28, wherein: the first SRS occasion corresponds to at least one first time slot; and the second SRS occasion corresponds to at least one second time slot that is different from the at least one first time slot.

Aspect 30: A base station comprising: a transceiver, a memory, and a processor communicatively coupled to the transceiver and the memory, wherein the processor is configured to perform any one of aspects 1 through 13.

Aspect 31: An apparatus configured for wireless communication comprising at least one means for performing any one of aspects 1 through 13.

Aspect 32: A non-transitory computer-readable medium storing computer-executable code, comprising code for causing an apparatus to perform any one of aspects 1 through 13.

Aspect 33: A user equipment comprising: a transceiver configured to communicate with a radio access network, a memory, and a processor communicatively coupled to the transceiver and the memory, wherein the processor is configured to perform any one of aspects 15 through 29.

Aspect 34: An apparatus configured for wireless communication comprising at least one means for performing any one of aspects 15 through 29.

Aspect 35: A non-transitory computer-readable medium storing computer-executable code, comprising code for causing an apparatus to perform any one of aspects 15 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1, 2, 7, 8, and 12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A base station, comprising:
a transceiver;
a memory; and
one or more processors coupled to the transceiver and the memory, wherein the one or more processors are individually or collectively configured to:
transmit to a user equipment via the transceiver a plurality of sounding reference signal (SRS) configurations that are defined to maintain phase continuity across a plurality of SRS transmissions associated with a plurality of SRS occasions that are separated in time;
receive from the user equipment a first SRS transmission of the plurality of SRS transmissions via the transceiver during a first SRS occasion of the plurality of SRS occasions;
receive from the user equipment a second SRS transmission of the plurality of SRS transmissions via the transceiver during a second SRS occasion of the plurality of SRS occasions; and
jointly process the first SRS transmission and the second SRS transmission to generate an SRS estimate.

2. The base station of claim 1, wherein each of the plurality of SRS configurations specify at least one of: the same spatial relation information, the same uplink transmission configuration indicator state, the same transmission comb, the same number of SRS ports, the same frequency domain position in the same bandwidth part, the same frequency hop parameters, the same transmit power, or a combination thereof.

3. The base station of claim 1, wherein the plurality of SRS configurations comprises a first SRS configuration for the first SRS transmission and a second SRS configuration for the second SRS transmission.

4. The base station of claim 3, wherein:
the first SRS configuration specifies a first set of spatial relation information;
the second SRS configuration specifies a second set of spatial relation information; and
the first set of spatial relation information and the second set of spatial relation information specify at least one of: the same serving cell identifier, the same synchronization signal block index, the same channel state information reference signal index, the same SRS resource identifier, the same uplink bandwidth part, or a combination thereof.

5. The base station of claim 3, wherein:
the first SRS configuration specifies a first uplink transmission configuration indicator (TCI) state; and
the second SRS configuration specifies the first uplink transmission configuration indicator (TCI) state.

6. The base station of claim 3, wherein:
the first SRS configuration specifies at least one of: a first number of ports, a first transmission comb value, a first frequency domain position, a first frequency hopping configuration value, a first SRS bandwidth and a first SRS hopping bandwidth, a first transmit power configuration, or a combination thereof; and
the second SRS configuration specifies at least one of: the first number of ports, the first transmission comb value, the first frequency domain position, the first frequency hopping configuration value, the first SRS bandwidth and the first SRS hopping bandwidth, the first transmit power configuration, or a combination thereof.

7. The base station of claim 3, wherein:
the one or more processors are further individually or collectively configured to transmit at least one downlink control information (DCI) to the user equipment via the transceiver;
the at least one DCI specifies a first resource for the first SRS occasion and a second resource for the second SRS occasion; and
the at least one DCI specifies that the user equipment is to use the first SRS configuration for the first SRS transmission during the first SRS occasion and that the user equipment is to use the second SRS configuration for the second SRS transmission during the second SRS occasion.

8. The base station of claim 1, wherein the one or more processors are further individually or collectively configured to:
specify the same parameter values for the plurality of SRS configurations.

9. The base station of claim 1, wherein the one or more processors are further individually or collectively configured to:
define the plurality of SRS configurations.

10. The base station of claim 1, wherein the one or more processors are further individually or collectively configured to:
receive capability information from the user equipment via the transceiver, wherein the capability information indicates that the user equipment supports maintaining phase continuity across different SRS transmissions for different SRS occasions; and
transmit an indication to the user equipment via the transceiver after receiving the capability information, wherein the indication is to configure the user equipment to maintain phase continuity across the first SRS transmission and the second SRS transmission.

11. The base station of claim 1, wherein the one or more processors are further individually or collectively configured to:
   combine the first SRS transmission and the second SRS transmission to provide a combined SRS transmission, wherein where a first weight is associated with the first SRS transmission and a second weight is associated with the second SRS transmission; and
   process the combined SRS transmission to generate the SRS estimate.

12. The base station of claim 1, wherein the one or more processors are further individually or collectively configured to:
   process the first SRS transmission to provide a first SRS estimate;
   process the second SRS transmission to provide a second SRS estimate; and
   combine the first SRS estimate and the second SRS estimate to generate the SRS estimate, wherein where a first weight is associated with the first SRS transmission and a second weight is associated with the second SRS transmission.

13. The base station of claim 1, wherein the one or more processors are further individually or collectively configured to:
   determine to jointly process the plurality of SRS transmission based on at least one of:
   whether the user equipment is near a cell edge of a serving cell for the user equipment, whether a quality of a channel between the user equipment and the base station is less than a threshold quality, whether a signal-to-noise ratio associated with the user equipment is less than a threshold signal- to-noise ratio, or a combination thereof.

14. A method of wireless communication at a base station, the method comprising:
   transmitting to a user equipment a plurality of sounding reference signal (SRS) configurations that are defined to maintain phase continuity across a plurality of SRS transmissions associated with a plurality of SRS occasions that are separated in time;
   receiving from the user equipment a first SRS transmission of the plurality of SRS transmissions during a first SRS occasion of the plurality of SRS occasions;
   receiving from the user equipment a second SRS transmission of the plurality of SRS transmissions during a second SRS occasion of the plurality of SRS occasions; and
   jointly processing the first SRS transmission and the second SRS transmission to generate an SRS estimate.

15. A user equipment, comprising:
a transceiver;
a memory; and
one or more processors coupled to the transceiver and the memory, wherein the one or more processors are individually or collectively configured to:
   receive via the transceiver a first resource allocation for a first sounding reference signal (SRS) transmission scheduled for a first SRS occasion and a first SRS configuration for the first SRS transmission;
   receive via the transceiver a second resource allocation for a second SRS transmission scheduled for a second SRS occasion and a second SRS configuration for the second SRS transmission, the first SRS occasion and the second SRS occasion being separated in time;
   receive via the transceiver an indication to maintain phase continuity across the first SRS transmission and the second SRS transmission; and
   transmit via the transceiver the first SRS transmission during the first SRS occasion and the second SRS transmission during the second SRS occasion after verifying whether use of the first SRS configuration and the second SRS configuration maintains the phase continuity across the first SRS transmission and the second SRS transmission.

16. The user equipment of claim 15, wherein the one or more processors are further individually or collectively configured to:
   determine that use of the first SRS configuration and the second SRS configuration maintains the phase continuity across the first SRS transmission and the second SRS transmission.

17. The user equipment of claim 16, wherein the one or more processors are further individually or collectively configured to:
   transmit the first SRS transmission via the transceiver according to the first SRS configuration and transmit the second SRS transmission via the transceiver according to the second SRS configuration, maintaining the phase continuity across the first SRS transmission and the second SRS transmission.

18. The user equipment of claim 17, wherein the one or more processors are further individually or collectively configured to:
   maintain substantially the same phase continuity across the first SRS transmission and the second SRS transmission.

19. The user equipment of claim 15, wherein the one or more processors are further individually or collectively configured to:
   determine that use of the first SRS configuration and the second SRS configuration will not maintain the phase continuity across the first SRS transmission and the second SRS transmission.

20. The user equipment of claim 19, wherein the one or more processors are further individually or collectively configured to:
   transmit the first SRS transmission via the transceiver according to the first SRS configuration, transmit the second SRS transmission via the transceiver according to the second SRS configuration, and abstain from maintaining the phase continuity across the first SRS transmission and the second SRS transmission.

21. The user equipment of claim 19, wherein the one or more processors are further individually or collectively configured to:
   transmit the first SRS transmission via the transceiver and transmit the second SRS transmission via the transceiver, maintaining the phase continuity across the first SRS transmission and the second SRS transmission.

22. The user equipment of claim 15, wherein the one or more processors are further individually or collectively configured to:
   determine whether the first SRS configuration and the second SRS configuration specify at least one of: the same spatial relation information, the same uplink transmission configuration indicator state, the same transmission comb, the same number of SRS ports, the same frequency domain position in the same bandwidth part, the same frequency hop parameters, the same transmit power, or a combination thereof.

23. The user equipment of claim 15, wherein:
the first SRS configuration specifies a first set of spatial relation information;
the second SRS configuration specifies a second set of spatial relation information; and
the one or more processors are further individually or collectively_configured to determine whether the first set of spatial relation information and the second set of spatial relation information specify at least one of: the same serving cell identifier, the same synchronization signal block index, the same channel state information reference signal index, the same SRS resource identifier, the same uplink bandwidth part, or a combination thereof.

24. The user equipment of claim 15, wherein, to verify whether use of the first SRS configuration and the second SRS configuration maintains the phase continuity across the first SRS transmission and the second SRS transmission, the one or more processors are further individually or collectively configured to determine at least one of: whether the first SRS configuration specifies a first uplink transmission configuration indicator state, whether the first SRS configuration specifies a first number of ports, whether the first SRS configuration specifies a first transmission comb value, whether the first SRS configuration specifies a first frequency domain position, whether the first SRS configuration specifies a first frequency hopping configuration value, whether the first SRS configuration specifies a first SRS bandwidth and a first SRS hopping bandwidth, whether the first SRS configuration specifies a first transmit power configuration, or a combination thereof.

25. The user equipment of claim 24, wherein, to verify whether the use of the first SRS configuration and the second SRS configuration maintains the phase continuity across the first SRS transmission and the second SRS transmission, the one or more processors are further individually or collectively configured to determine at least one of: whether the second SRS configuration specifies the first uplink transmission configuration indicator state, whether the second SRS configuration specifies the first number of ports, whether the second SRS configuration specifies the first transmission comb value, whether the second SRS configuration specifies the first frequency domain position, whether the second SRS configuration specifies the first frequency hopping configuration value, whether the second SRS configuration specifies the first SRS bandwidth and the first SRS hopping bandwidth, whether the second SRS configuration specifies the first transmit power configuration, or a combination thereof.

26. The user equipment of claim 15, wherein the one or more processors are further individually or collectively configured to:

transmit capability information to a base station via the transceiver, wherein the capability information indicates that the user equipment supports maintaining phase continuity across different SRS transmissions for different SRS occasions; and
receive the indication via the transceiver after transmitting the capability information.

27. The user equipment of claim 15, wherein:
the one or more processors are further individually or collectively_configured to receive at least one downlink control information (DCI) from a base station via the transceiver; and
the at least one DCI specifies that the user equipment is to use the first SRS configuration for the first SRS transmission during the first SRS occasion and that the user equipment is to use the second SRS configuration for the second SRS transmission during the second SRS occasion.

28. The user equipment of claim 15, wherein the one or more processors are further individually or collectively configured to:
receive a medium access control-control element (MAC-CE) that includes the indication via the transceiver.

29. The user equipment of claim 15, wherein:
the first SRS occasion corresponds to at least one first time slot; and
the second SRS occasion corresponds to at least one second time slot that is different from the at least one first time slot.

30. A method for wireless communication at a user equipment, the method comprising:
receiving a first resource allocation for a first sounding reference signal (SRS) transmission scheduled for a first SRS occasion and a first SRS configuration for the first SRS transmission;
receiving a second resource allocation for a second SRS transmission scheduled for a second SRS occasion and a second SRS configuration for the second SRS transmission, the first SRS occasion and the second SRS occasion being separated in time;
receiving an indication to maintain phase continuity across the first SRS transmission and the second SRS transmission; and
transmitting the first SRS transmission during the first SRS occasion and the second SRS transmission during the second SRS occasion after verifying whether use of the first SRS configuration and the second SRS configuration maintains the phase continuity across the first SRS transmission and the second SRS transmission.

* * * * *